US009690313B2

(12) United States Patent
Matan et al.

(10) Patent No.: US 9,690,313 B2
(45) Date of Patent: Jun. 27, 2017

(54) POWER TRANSFER MANAGEMENT FOR LOCAL POWER SOURCES OF A GRID-TIED LOAD

(71) Applicant: XSLENT Energy Technologies, LLC, Novato, CA (US)

(72) Inventors: Stefan Matan, Novato, CA (US); William B Westbrock, Jr., San Rafael, CA (US); Fred C Horton, Santa Rosa, CA (US); Joseph M Klemm, Santa Rosa, CA (US); Frank P Marrone, Cloverdale, CA (US); Arnold F McKinley, Mill Valley, CA (US); Kurt W Wiseman, Tiburon, CA (US)

( * ) Notice: Subject to any disclaimer, the term of this patent is extended or adjusted under 35 U.S.C. 154(b) by 268 days.

(21) Appl. No.: 14/185,509

(22) Filed: Feb. 20, 2014

(65) Prior Publication Data

US 2014/0350742 A1    Nov. 27, 2014

Related U.S. Application Data

(62) Division of application No. 12/708,514, filed on Feb. 18, 2010, now Pat. No. 8,693,228.
(Continued)

(51) Int. Cl.
*H02M 1/12*      (2006.01)
*G05F 1/70*      (2006.01)
(Continued)

(52) U.S. Cl.
CPC .............. *G05F 1/70* (2013.01); *G05B 15/02* (2013.01); *H02J 3/18* (2013.01); *H02J 3/50* (2013.01);
(Continued)

(58) Field of Classification Search
CPC ........ H02M 1/10; H02M 7/42; H02M 1/4233; H02M 1/12; G05F 1/67; G05F 1/70; Y02E 10/50; H02J 3/18
(Continued)

(56) References Cited

U.S. PATENT DOCUMENTS 5,041,959 A * 8/1991 Walker .................... H02J 15/00
307/46
5,109,185 A    4/1992 Ball
(Continued)

FOREIGN PATENT DOCUMENTS

CN    100379121    4/2008
EP    1928081    6/2008
(Continued)

OTHER PUBLICATIONS

International Search Report & WO for PCT/US2009/058492, mailed May 10, 2010, 11 pages.
(Continued)

*Primary Examiner* — Gary L Laxton
(74) *Attorney, Agent, or Firm* — Compass IP Law PC

(57) ABSTRACT

A power transfer system provides power factor conditioning of the generated power. Power is received from a local power source, converted to usable AC power, and the power factor is conditioned to a desired value. The desired value may be a power factor at or near unity, or the desired power factor may be in response to conditions of the power grid, a tariff established, and/or determinations made remotely to the local power source. Many sources and power transfer systems can be put together and controlled as a power source farm to deliver power to the grid having a specific power factor characteristic. The farm may be a grouping of multiple local customer premises. AC power can also be con-
(Continued)

ditioned prior to use by an AC to DC power supply for more efficient DC power conversion.

18 Claims, 17 Drawing Sheets

Related U.S. Application Data

(60) Provisional application No. 61/153,940, filed on Feb. 19, 2009, provisional application No. 61/165,167, filed on Mar. 31, 2009, provisional application No. 61/263,239, filed on Nov. 20, 2009.

(51) Int. Cl.
| | |
|---|---|
| *H02J 3/18* | (2006.01) |
| *H02M 1/42* | (2007.01) |
| *H02M 7/48* | (2007.01) |
| *H02J 3/50* | (2006.01) |
| *G05B 15/02* | (2006.01) |
| *H02M 7/42* | (2006.01) |

(52) U.S. Cl.
CPC ............... *H02M 1/42* (2013.01); *H02M 7/48* (2013.01); *Y02B 70/12* (2013.01); *Y02E 40/30* (2013.01)

(58) Field of Classification Search
USPC .................. 363/95, 97; 323/906; 307/11, 26
See application file for complete search history.

(56) References Cited

U.S. PATENT DOCUMENTS

| | | | |
|---|---|---|---|
| 7,015,597 B2* | 3/2006 | Colby | H02J 3/1835 307/31 |
| 7,102,430 B2 | 9/2006 | Johnson et al. | |
| 7,183,667 B2 | 2/2007 | Colby et al. | |
| 7,479,774 B2 | 1/2009 | Wai et al. | |
| 7,698,219 B2 | 4/2010 | Kremen et al. | |
| 7,733,670 B2* | 6/2010 | Feng | H02J 7/35 363/17 |
| 7,768,155 B2 | 8/2010 | Fornage | |
| 7,824,191 B1 | 11/2010 | Browder | |
| 7,906,870 B2 | 3/2011 | Ohm | |
| 8,049,366 B2 | 11/2011 | Shyu et al. | |
| 8,068,352 B2 | 11/2011 | Yu et al. | |
| 8,334,618 B2* | 12/2012 | Bhavaraju | H02J 3/38 307/86 |
| 8,912,767 B2* | 12/2014 | Morati | H02M 7/537 323/207 |
| 2001/0048290 A1 | 12/2001 | Underwood et al. | |
| 2003/0085621 A1 | 5/2003 | Potega | |
| 2006/0092588 A1 | 5/2006 | Realmuto et al. | |
| 2007/0236187 A1 | 10/2007 | Wai et al. | |
| 2008/0122293 A1 | 5/2008 | Ohm | |
| 2008/0130332 A1 | 6/2008 | Taimela et al. | |
| 2009/0021078 A1 | 1/2009 | Corhodzic et al. | |

FOREIGN PATENT DOCUMENTS

| | | |
|---|---|---|
| JP | 05-292670 | 11/1993 |
| JP | 06-149397 | 5/1994 |
| JP | 07-031156 | 1/1995 |
| JP | 07-194134 | 7/1995 |
| JP | 08-290269 | 11/1996 |
| JP | 11-089238 | 3/1999 |
| JP | 2000-228881 | 8/2000 |
| JP | 2002-315389 | 10/2002 |
| JP | 2004-242451 | 8/2004 |
| JP | 2005-192336 | 7/2005 |
| JP | 2004-4242451 | 8/2005 |
| JP | 2006-158179 | 6/2006 |
| JP | 2007-215257 | 8/2007 |

OTHER PUBLICATIONS

International Search Report & WO for PCT/US2010/024780, mailed Sep. 29, 2010, 9 pages.
International Preliminary Report on Patentability for PCT/US2010/024780, mailed Sep. 1, 2011, 6 pages.
Office Action from Korean Application No. 10-2011-7009531, mailed Mar. 21, 2012, 5 pages.
Office Action from Singapore Application No. 201105994-6, mailed Feb. 16, 2012, 8 pages.
Office Action from Mexican Application No. MX/a/2011/003231, mailed Jul. 9, 2012, 3 pages.
Office Action from Singapore Application No. 201102128-4, mailed Mar. 12, 2012, 6 pages.
Office Action from Mexican Application No. MX/a/2011/008818, mailed Oct. 15, 2012, 13 pages.
Office Action from Korean Application No. 10-2011-7021818, mailed Sep. 21, 2012, 4 pages.
Final Office Action from Korean Application No. 10-2011-7009531, mailed Nov. 9, 2012, 3 pages.
Office Action from Chinese Application No. 200980138202.X, mailed Dec. 17, 2012, 9 pages.
Office Action from Australian Application No. 2009296407, mailed Mar. 22, 2013, 3 pages.
Final Office Action from Korean Application No. 10-2011-7021818, mailed May 9, 2013, 4 pages.
Office Action from Japanese Application No. 2011-551256, mailed Apr. 10, 2013, 2 pages.
Office Action from Korean Application No. 10-2011-7009531, mailed Mar. 27, 2013, 2 pages.
Office Action from Japanese Application No. 2011-529288, mailed Jul. 3, 2013, 3 pages.
Office Action from Chinese Application No. 201080015590.5, mailed Jul. 16, 2013, 14 pages.
Office Action from Canadian Application No. 2,738,653, mailed Aug. 27, 2013, 3 pages.
Office Action from Korean Application No. 10-2013-7016773, mailed Sep. 2, 2013, 4 pages.
Office Action from Canadian Application No. 2,753,094, mailed Oct. 24, 2013, 3 pages.
Office Action from Australian Application No. 2010215876, mailed Apr. 16, 2013, 3 pages.
Notice of Allowance from Singapore Application No. 201102128-4, mailed Jan. 25, 2013, 5 pages.
Notice of Allowance from Chinese Application No. 200980138202.X, mailed Aug. 6, 2013, 4 pages.

* cited by examiner

POWER TRANSFER MANAGEMENT FOR LOCAL POWER SOURCES OF A GRID-TIED LOAD

RELATED APPLICATION INFORMATION

The present application is a divisional application from U.S. patent application Ser. No. 12/708,514, filed Feb. 18, 2010, and claims the benefit of priority of that application.

Further, the present application is a non-provisional of U.S. Provisional Patent Application Ser. No. 61/153,940 filed Feb. 19, 2009, entitled "Power Transfer Management for Local Power Sources of a Grid-Tied Load", and of U.S. Provisional Patent Application Ser. No. 61/165,167 filed Mar. 31, 2009, entitled "Power Transfer Management for Local Power Sources of a Grid-Tied Load", and of U.S. Provisional Patent Application Ser. No. 61/263,239 filed Nov. 20, 2009, entitled "Automatic and Remote Management of Power Factor in Grid-Tied Solar Photovoltaic Systems", and claims the benefit of priority of said applications.

FIELD

Embodiments of the invention relate to power conversion, and embodiments of the invention more particularly relate to management of power transfer from a local power source to a load that is tied to a utility power grid.

BACKGROUND

There have been many efforts over time to use local power sources to supplement energy requirements from a utility power grid. Common examples include solar cells with photovoltaic (PV) inverters. Other examples may use wind energy, or another naturally occurring source, such as geothermal energy. Such sources are used in tandem with power drawn from a traditional power grid in the hope of reducing the power (and consequent cost) drawn from the grid. Such systems are designed to deliver power from the source to a load that includes both the local load and the power grid. Thus, from the perspective of the local source looking out, traditional designs lump the local load and the grid as the target for power delivery from the system. Therefore, in practice such systems have always supplied both real and reactive power to the local load.

The power transfer from the local source to the local load is typically inefficient, resulting in the user wasting energy generated locally, which is then drawn from the grid. Thus, even where a local source may generate significant amounts of energy that would seemingly satisfy the needs of the local load, the local load typically must also draw real and reactive power from the grid at measurable cost to the customer.

The tariff governing the cost of electricity to utility power grid customers depends upon many factors, including size of a customer's base load, the time of day that the electricity is demanded, and the type of power demanded (whether it be active or reactive power). The tariff structure requires the customer to pay more, for example, if the power is used during peak demand hours, when the utility has little reserve available for emergencies, or, for example, if the type of power is active, instead of reactive power. In general, residential customers do not pay for reactive power under current tariffs, whereas industrial customers do.

Reactive power is becoming more costly to the utilities to produce than it once was, for several reasons. First, the demand for reactive power is growing much faster than for active power, because many new electronic and electrical products are requiring more reactive power than ever before. These products include plasma and LCD TVs, computer power supplies, and grid-tie electrical vehicles. Second, reactive power is more costly to transport down long distance transmission lines than is active power, because it causes voltage drops approximately 10 times greater than does active power. Third, although reactive power can be compensated for on the local distribution lines, thereby canceling the need to build larger generating stations many kilometers away, the compensators are expensive to buy and maintain.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Figure 1:
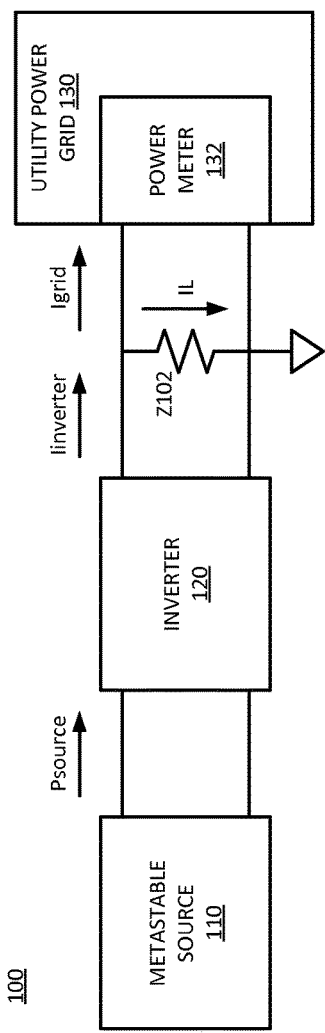
FIGS. 1-2 each illustrate a block diagram of an embodiment of a system that transfers power from a local source to a grid-tied load with power factor conditioning.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

Real-time conditioning of power factor enables more efficient power transfer from a local source to a grid-tied local load. Additionally, the power transfer from the source to the load is further improved with reduction of harmonic distortion in accordance with total harmonic distortion control, and maximum power extraction from unstable and variable energy sources with dynamic impedance matching. Current systems that use power from a local source do not condition the power factor of the generated power from the variable or unstable source. As used herein, "metastable" refers to a source that may be unstable or variable in its production of power. Examples of such sources are solar arrays, windmills, or other "green" sources. As used herein, a "local" load and a "local" source are local with respect to each other. Local refers to being on the same electrical system with respect to each other, and more specifically, being on the same side of a power grid point of connection (e.g., the "line in" from the grid that typically goes through a power meter and breaker box). Local does not necessarily imply any specific geographic requirements other than practical limitations for system design that would be apparent to one skilled in the art.

In prior systems that attach metastable sources as power sources to a grid-tied (local) load (e.g., a house, apartment, cabin, or other dwelling), power factor conditioning is not considered with respect to the grid power. Power factor has not been considered significant to a utility power consumer, but is rather a consideration of the power utility and industrial consumers with large inductive machinery. Power factor correction for utility consumers, especially with respect to power generated from metastable sources, may not be considered because: a) impedance loads typically have been thought of as the controller of power factor, not the inverters that supply power to the load; and, b) in engineering models that consider power flow, the local load is not usually distinguished from the general load on the side of the utility power grid (looking out from the local source). Thus, maximizing power transfer to the local load is not considered in engineering models concerned with attaching metastable sources to the power grid.

However, considering the local load separately from the general load on the side of the utility power grid, and controlling power transfer to the local load, including conditioning power factor of the generated power and maximizing power transfer to the load can result in greatly improved power transfer efficiency. Additionally, as set forth in more detail below, the use of power factor conditioning can result in having only real power supplied by the metastable source, and all reactive power requirements are supplied by the grid. In certain circumstances, the grid may provide only reactive power, and no real power to the load.

FIG. 1 is a block diagram of an embodiment of a system that transfers power from a local source to a grid-tied load with power factor conditioning. System 100 represents a power system that includes metastable source 110, inverter 120, load Z102, and utility power grid 130. Load Z102 represents a consumer premises (e.g., a home) tied to grid 130. Metastable source 110 (e.g., solar cells/array, wind power generator, or other time-varying or green power source) and inverter 120 are local to load Z102, and provide power to the load. More particularly, metastable source 110 produces a variable/unstable source of DC power (shown as Psource, or source power). The source may be time-varying and/or change in available power due to environmental conditions. Inverter 120 represents a dynamic power extractor and inverter apparatus.

Under normal operation, DC power is drawn from source 110, and extracted, inverted, and dynamically treated by inverter 120, to dynamically produce maximum AC current relatively free of harmonic distortion and variability, and completely in phase with the AC voltage signal from power grid 130. Putting the generated AC current in phase with the grid AC voltage produces AC power with a power factor at or near unity to load Z102, meaning that all reactive power drawn by the load comes from grid 130. If source 110 produces enough energy to satisfy the real power requirements of load Z102, the only AC power drawn from grid 130 by the load is, or nearly is, exclusively reactive power. When source 110 is unable to produce DC power sufficient to serve the load, real power may also be drawn from the grid in the ordinary fashion.

Alternatively, as described in more detail below, the AC current may be intentionally changed to be out of phase to a certain extent with respect to the AC voltage signal of the grid. Thus, the single inverter 120 can deliver power at any desired power factor to compensate for conditions of power on power grid 130.

The inverter current (Iinverter) and the grid current (Igrid) are shown pointed towards grid 130, illustrating the scenario where sufficient energy is produced by source 110 to actually service Z102 with the load current (IL), and "give back" to the grid. Power can be given back generally to the grid, and the customer can be appropriately compensated for power provided to the grid. Additionally, a give back scenario can involve providing power to a neighbor customer, as described in more detail below with respect to FIG. 14.

Grid 130 includes power meter 132, which measures the real power consumed by load Z102. Typically, the voltage and current are measured, and the power computed. Note that in the case where only reactive power is drawn from the grid, power meter 132 will not measure any power usage by load Z102.

As discussed, in one embodiment, the power factor delivered by inverter 120 to load Z102 is at or near 1.0 for introduction to the local load and to the power grid. In addition to power factor correction, inverter 120 provides harmonic distortion correction. In one embodiment, inverter 120 provides table-based harmonic distortion correction. Previous harmonic distortion techniques use a hardware-based method or Fast Fourier Transform (FFT). The table-based method implemented on a processor or controller reduces cost per inverter and scales better than typical hardware implementations.

In addition to causing a power factor near or at unity for power delivered from inverter 120, inverter also monitors the operating conditions, and provides maximum power from the source 110 dynamically and in real time with changes in the energy source and current load. Thus, if the amount of energy generated by source 110 changes, inverter 120 can modify the output based on that source in real time. Additionally, if the resistive conditions of load Z102 (e.g., an inductive motor such as a vacuum is turned on), power factor correction automatically tracks the needs of the load and adjusts to the real-time changes in the load. Additionally, total harmonic distortion adjusts for harmonic distortion more efficiently than what is required by standards, thus complying with standards and improving performance of the system by dynamically adjusting to variable and unstable power sources, and to a changing load.

It will be understood that if the output voltage and current of inverter 120 are matched in phase with each other and with the voltage on the grid (e.g., through a phase lock loop, or through a power generation sampling and feedback mechanism), any reactive power necessary will be absorbed from the grid. The more real power provided by source 110, the further out of phase the grid voltage and the grid current will be locally at Z102. If all real power is provided locally, the current and voltage of the grid will be 90 degrees out of phase locally at load Z102, causing the grid real power contribution to fall to 0 (recall that Preal=(Vmax*Imax/2) cos(Vphase−Iphase)).

Figure 2:
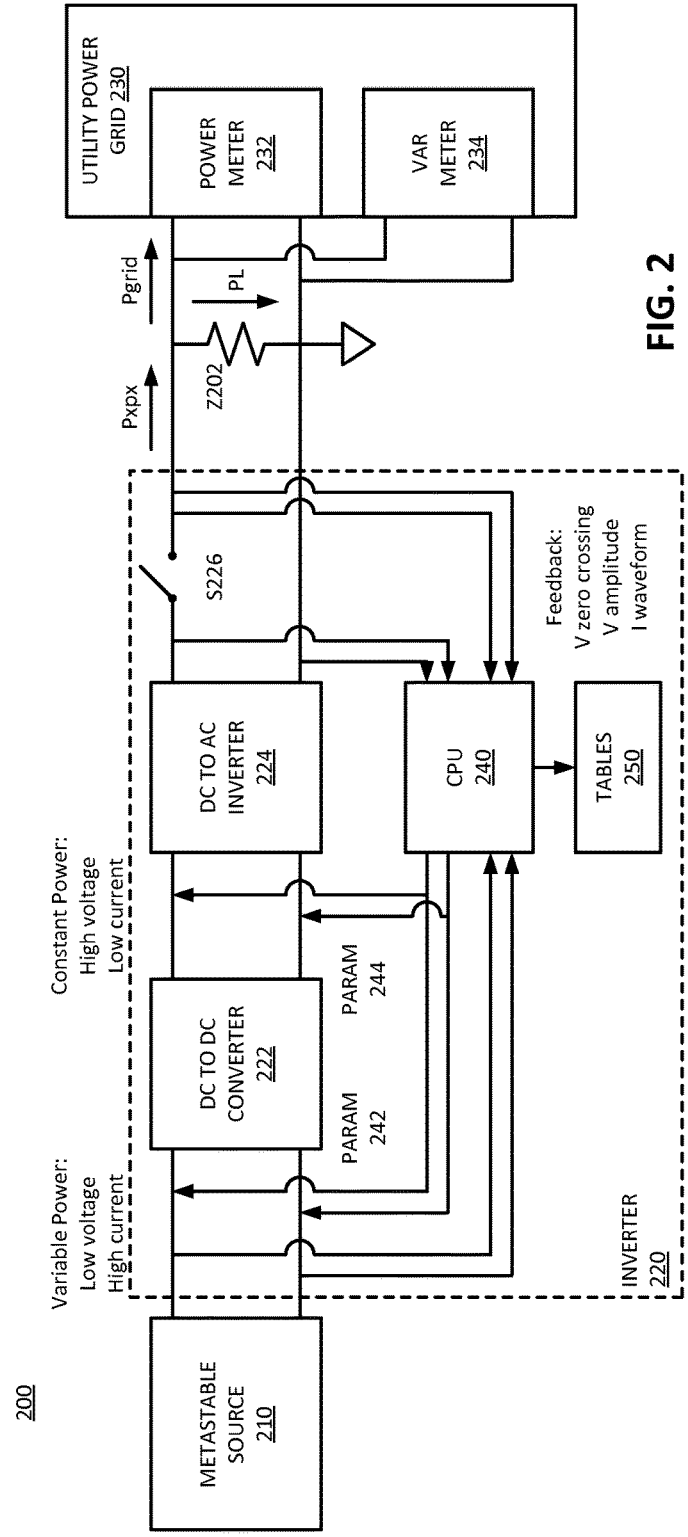

FIG. 2 is a block diagram of an embodiment of a system that transfers power from a local source to a grid-tied load with power factor conditioning. System 200 provides one example of system 100 of FIG. 1. Metastable source 210 is a variable or unstable power source. System 200 includes inverter 220, which includes DC/DC converter 222, coupled to DC/AC inverter 224, both of which are coupled to and controlled by controller (CPU) 240. Additionally, switching device S226 (e.g., a relay) selectively connects the inverter to load Z202 and grid 230.

Controller 240 monitors the AC current, which moves out of DC/AC inverter 224, and the generated voltage of grid 230, which appears across load Z202. Controller 240 controls at least one parameter, parameter 242, of the operation of converter 222, and parameter 244, of the operation of inverter 224. Parameters 242 and/or 244 may be a duty cycle of a switching signal of the power extraction devices (see figures below for further description). The modification of the parameter is dependent on the quality of the monitored current and voltage. Controller 240 further controls switching device S226 to couple the load to power produced (by converter 222 and inverter 224 from source 210), when suitably conditioned power is available for use by the load.

In operation, controller 240 dynamically monitors the operation of the system to extract and produce AC current from source 210 at a selected power factor (e.g., fully in phase or at some other phase) with respect to the AC voltage provided by grid 230. When the current is sufficiently conditioned and abundant for use with the load, the load and the grid are presented with the full maximum real power, meaning primarily or only reactive power is drawn from the power grid. Because power meter 232 registers only real power drawn from grid 230 by load Z202, and not reactive power, the real power drawn by the local load is not billed.

In one embodiment, utility power grid 230 includes var (volt-amperes reactive) meter 234 to monitor the use of vars by load Z202. The vars may be monitored by performing measurements based on the phase of the current and voltage of the grid power at the load, and performing calculations based on the measured values.

In one embodiment, inverter 220 includes tables 250, which provides a table-based method for controlling power factor. The tables may include entries that are obtained based on input conditions measured from the system, to achieve a desired power factor. Feedback from the grid-tied node may include voltage zero crossing, voltage amplitude, and current waveform information. With such information, controller 240 uses tables 250 to adjust the operation of converter 222 and/or inverter 224. The tables may include setpoints that provide idealized output signals the system attempts to create. By matching output performance to an idealized representation of the input power, better system performance is possible than simply attempting to filter and adjust the output in traditional ways.

While certain specific discussions are provided above with respect to systems 100 and 200, in general, the systems may be further described by the following. Metastable DC power is dynamically treated with an apparatus to produce maximum AC power at unity power factor and low harmonic distortion. An apparatus could be provided having circuitry to couple the metastable source to the load, such as connecting to the load's grid connection. The apparatus may include a DC/DC converter and a DC/AC converter (inverter) having at least one dynamically modifiable parameter (e.g., duty cycle of a switching control component, pulse train period of a pulse train used to construct a signal), controlled by a power generation controller.

The controller dynamically modifies the parameters to produce low-distortion AC current. In one embodiment, the AC current is entirely in phase with the voltage provided by the grid, thus having a power factor near unity, so that all or most of the actual real power requirements are provided by the apparatus. Consequently, only or mostly reactive power, if any, would be drawn from the grid. Such an approach maximizes the benefit of treating the load with energy drawn from the metastable DC energy source, while minimizing the cost of drawing energy from the grid.

In one embodiment, the dynamic modification of the parameters is performed with a table-based method for adaptively modifying the produced AC current waveform to correct power-factor and to reduce total harmonic distortion. Additionally, the energy transfer is maximized by the use of a dynamic means to extract power, such as described in Besser et al., Multi Source, Multi-load Systems with a Power Extractor, U.S. Publication No. 2008/0122518 A1, and as described in more detail below with respect to FIG. 4.

Figure 3:
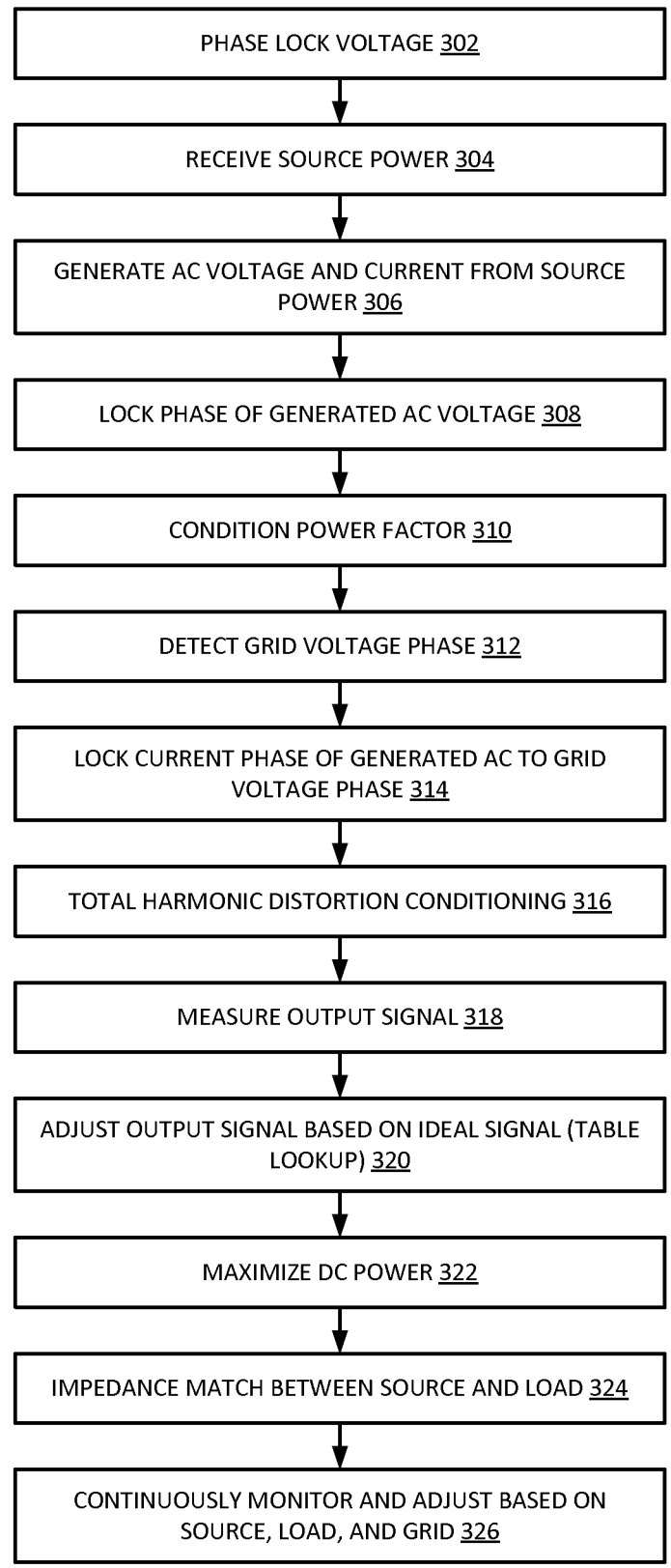
FIG. 3 is a flow diagram of an embodiment of a process for transferring power from a local source to a grid-tied load with power factor conditioning.

FIG. 3 is a flow diagram of an embodiment of a process for transferring power from a local source to a grid-tied load with power factor conditioning. Flow diagrams as illustrated herein provide examples of sequences of various process actions. Although shown in a particular sequence or order, unless otherwise specified, the order of the actions can be modified. Thus, the illustrated implementations should be understood only as an example, and the process for establishing the secure channel can be performed in a different order, and some actions may be performed in parallel. Additionally, one or more actions can be omitted in various embodiments of the invention; thus, not all actions are required in every implementation. Other process flows are possible. Additionally, it will be understood that not all operations illustrated and discussed are necessary in every embodiment—some operations may be optional.

The operation of an apparatus as discussed above with respect to dynamic conditioning may be described nominally in four parts. In a first part (e.g., 302-308), the AC voltage created by the apparatus is conditioned to be fully in phase with the AC voltage of the utility power grid. The conditioning brings the generated AC voltage into phase with the grid voltage. In the second part (e.g., 310-314), one or more parameters of the converters are controlled until the AC current derived from the apparatus is conditioned to be in a desired phase with respect to the AC voltage of the utility power grid (which is also in phase with the generated AC voltage). In one embodiment, the desired phase is fully in phase; thus, the power factor of the generated power is brought to unity. In the third part (e.g., 318-320), the one or more parameters can be further controlled until the total harmonic distortion of the AC current from the apparatus is reduced to a satisfactory level. In the fourth part (e.g., 322-326), the one or more parameters can be controlled to extract and provide maximum real power from the DC power source in a non-variable, constant manner.

In the first part, the voltage of the generated AC power is phase locked to the phase of the voltage of the grid, 302. The source power is received, 304, and converted into AC voltage and current, 306. The voltage of the grid can be measured and the phase of the generated AC voltage locked to the phase of the grid, 308. The AC voltage on the utility grid, across the local load, is periodically monitored by the controller, for example, with phase lock looping, and the one or more parameters is modified, until the inverter AC voltage is in phase with the power grid voltage.

In the second part, the power factor is conditioned, 310. The AC current produced by the inverter is monitored at a periodic interval rate, and the grid voltage phase is detected, 312. In one embodiment, the periodic interval rate of monitoring the AC current is performed not fewer than 320 times per second. Dynamical modification of the inverter parameter, based on a table of pre-defined values, occurs until the alternating AC current produced by the inverter is at, or nearly in phase with, the utility grid voltage across the load. Thus, the phase of the generated AC current is locked to the grid voltage phase, 314.

In the third part, the AC current generated by the apparatus is further conditioned to reduce total harmonic distortion, 316. The output signal being generated is measured or sampled, 318, and the output signal is adjusted based on an ideal signal through table lookup, 320. For example, the controller may dynamically modify a table of sine-wave values during each periodic 1/320 second interval until the total harmonic distortion satisfies a predetermined tolerance.

In the fourth part, the DC power is maximized, which results in the maximum power transfer. The apparatus can impedance match between the source and the load. The controller modifies a power extractor parameter (e.g., a parameter 212, 222, of the apparatus) to maximize the extracted current under then-current conditions, 326. Such power conversion can be performed as described more below.

Figure 4:
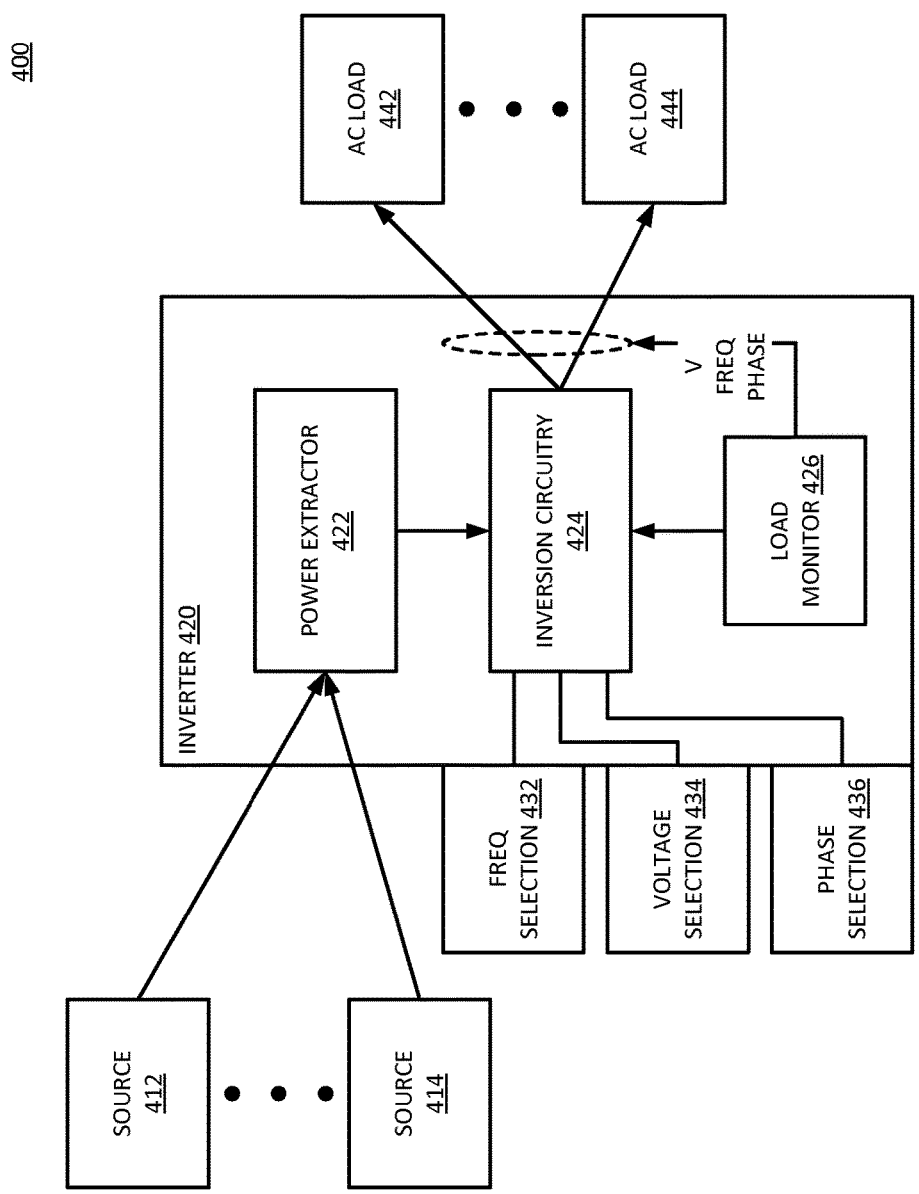
FIG. 4 is a block diagram of an embodiment of a system with multiple power sources, a power extractor, and multiple AC loads.

FIG. 4 is a block diagram of an embodiment of a system with multiple power sources, a power extractor, and multiple AC loads. System 400 represents a power transfer system having an inverter. As understood in the art, an inverter is an electronic device or system that produces alternating current (AC) from direct current (DC). Generally the DC to AC conversion is accomplished as a conversion of square-wave DC current to sinusoidal AC current. The inverter is generally the critical component in traditional photovoltaic (PV) and other renewable energy systems seeing it is responsible for the control of electricity flow between these energy systems and various electrical loads. The inverter performs the conversion of the variable DC source to a clean 50-60 Hz sinusoidal alternating current (AC). Inverters also perform maximum power point tracking (MPPT) ostensibly to keep power generation as efficient as possible. An inverter as described herein may also have a communications interface to a central station for the transmission of statistics and alerts.

As illustrated, power extractor 422 may be a component of inverter 420. Thus, the inverter system may include a power extractor as the power transfer element. System 400 includes one or more power sources 412-414, which can be dynamically coupled and decoupled to power extractor 422 to provide DC current. In addition to power transfer, in system 400 inversion circuitry 424 acts as a consumer of the output of power extractor 422. One or multiple AC loads 442-444 may be selectively, dynamically coupled and decoupled to inverter 420 to receive power from inversion circuitry 424.

Inversion circuitry 424 generally converts the efficiently-transferred output power of power extractor 422 and converts and filters the power in an efficient manner. The result is an inverter of much higher efficiency than systems implemented with traditional technologies. Discussions herein with regards to power distribution strategy, distributing power to one or more loads, or other power transferring, applies equally well to system 400 as it does to other described embodiments. Similar issues of monitoring output power will be applied in inversion circuitry 424 as are performed in power extractor 422. The mechanisms for monitoring the power output may be different in inversion circuitry 424 than that of power extractor 422.

Inversion circuitry 424 is an algorithmically operated non-linear current mode power converter. Inverter 420, via inversion circuitry 424, uses a geometric structure or topology to perform its current switching from output provided by power extractor 422. The current switching topology technology converts DC power into AC power under microprocessor control. The microprocessor may be a separate microprocessor than what may be employed in power extractor 422. The load requirements of AC loads 442-444 for voltage, frequency, and/or phase may be sensed under software control and thereby implemented to a desired voltage, frequency, and/or phase. Alternatively, or additionally (for example, as an override), the load requirements for voltage, frequency, and/or phase may be configuration controlled.

Load monitor 426 represents one or more components, whether hardware, software, or a combination (e.g., hardware with installed firmware control), which monitors the output of inversion circuitry 424 for voltage (V), frequency (FRED), and/or phase. Based on what is detected, and/or based on rules or external input, load monitor 426 can provide configuration to inversion circuitry 424. Note that even when load monitor 426 is implemented in hardware, its input into inversion circuitry 424 can be considered "software control" if input into a microprocessor of inversion circuitry 424. Load monitor 426 may also include a communication connection (not shown) to, for example, a central station that sends configuration parameters that are passed to inversion circuitry 424.

Additionally, or alternatively, to load monitor 426, inverter 420 may include more "manual" configuration mechanisms. Such configuration mechanisms may include switches (for example, commonly used configuration "DIP" (dual in-line package) switches. Other switches or comparable mechanisms could also be used. DIP switches typically have a row of sliders or rockers (or even screw-type rotational mechanisms) that can be set to one or another position. Each switch position may configure a different item, or the composite of all the switch positions can provide a binary "number" input to a microprocessor. Frequency selection 432 represents a configuration mechanism to set the output frequency of inverter 420. Voltage selection 434 can be used to select the output voltage of inverter 420. Phase selection 436 can be used to select the output phase of inverter 420. The use of frequency selection 432, voltage selection 434, and phase selection 436 can enable inverter 420 to operate correctly even in cases where voltage, frequency, or phase information is provided incorrectly from a grid on which inverter 420 operates.

Figure 5:
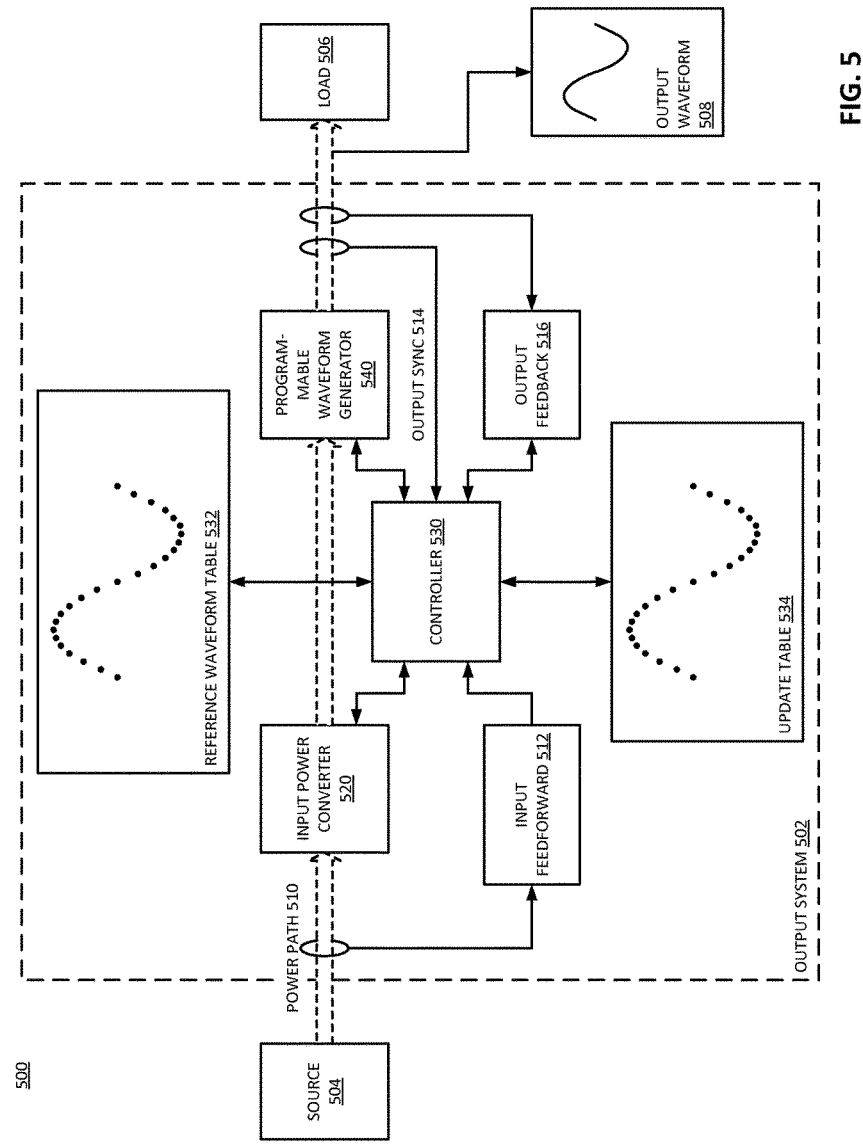
FIG. 5 is a block diagram of an embodiment of a system that controls harmonic distortion with a software feedback control subsystem coupled to a hardware waveform controller.

FIG. 5 is a block diagram of an embodiment of a system that controls harmonic distortion with a software feedback control subsystem coupled to a hardware waveform controller. System 500 includes power source 504, load 506, and output and control system 502. Power path 510 represents the path of electrical power from source 504 to load 506, as controlled by output system 502.

Output system 502 includes input power converter 520 to receive input power from source 504 and convert it to another form (e.g., DC to AC). Input power converter 520 includes hardware components for receiving a power signal to convert, and may include appropriate power components. In one embodiment, input power converter 520 implements dynamic impedance matching, which enables the input electronics to transfer maximum power from source 504. Dynamic impedance matching includes constantly tracking a maximum power point, as well as driving an input power coupler (e.g., a transformer) to maintain as flat a power slope as possible (e.g., slope of zero). Input power converter 520 may receive control signals or information from controller 530, as well as providing input to indicate operation of the converter.

Input feedforward 512 provides information (e.g., maximum power value, frequency as appropriate, or other information to control the input power converter hardware) about the source power to controller 530. Controller 530 controls input power converter 520 based on the input information about the input power. Controller 530 represents any type of processor controller that may be embedded in output system 502. Controller 530 may be or include any type of microcontroller, digital signal processor (DSP), logic array, or other control logic. Additionally, controller 530 may include appropriate memory or storage components (e.g., random access memory, read only memory (ROM), registers, and/or Flash) to store code or values generated or obtained during runtime operation or pre-computed.

Controller 530 drives programmable waveform generator 540 to generate the desired output waveform. Generator 540 also lies on power path 510, and receives input power from input power converter 520 to output. While the power may be transferred, it is not necessarily output with the same waveform as it is received. For example, a DC signal may be output as a sinusoidal signal, as shown in the example of FIG. 5. Other power conversions can be accomplished similarly as shown and described. In one embodiment, generator 540 includes a PWM to generate output waveform 508. Generator 540 receives control signals and information from controller 530, and may provide status or operations information or feedback to controller 530. The output waveform may be either current or voltage.

Output system 502 is able to incorporate specific timing, phasing, or other frequency information, into generating output waveform 508. Such timing, phasing, or other frequency information may be referred to as "input synchronization data." In one embodiment, such input synchronization data arrives from real-time load information, in which case it may be referred to as "load synchronization input." The load synchronization input or input synchronization data indicates information necessary to determine the synchronization signal discussed above. Such information is indicated in output system 502 as output sync 514. In a system where the output is anticipated (e.g., connecting to an electrical grid), certain voltage, timing, or other information may be expected (e.g., 520V at 60 Hz), and an initial estimate programmed in or made by the system at startup. Based on load synchronization data, the initial estimate may be adjusted.

Controller 530 also measures output feedback 516 off power path 510, to determine the actual output generated by generator 540. The actual output is compared to an ideal reference to determine if the desired output is being generated. In one embodiment, output feedback 516 is an abstraction to represent output measurement by controller 530, and does not include separate components in itself. In one embodiment, output feedback 516 includes a sampling mechanism or other data selection mechanism to compare to the ideal reference signal. If output feedback 516 includes components separate from controller 530, it may be driven by controller 530, and receive comparison data from controller 530 and provide error or feedback information. In one embodiment, output feedback 516 is understood to include at least hardware components necessary for a feedback control process to interface with the output lines. Additionally, output feedback 516 may include other hardware for performing measurements, computations, and/or performing processing.

Both output sync 514 and output feedback 516 may be considered feedback loops. It will be understood that output sync 514 and output feedback 516 are not the same thing, and serve different purposes. Output sync 514 indicates what the ideal reference signal should look like, as stored in reference waveform table 532. Output feedback 516 indicates how the actual output varies from the reference signal. Update table 534 represents data generated in response to output feedback 516. In one embodiment, output sync 514 is based on voltage information on the output of power path 510, while output feedback 516 is based on output current generated at the output of power path 510.

Based on output sync 514 (or based on an initial estimate of the output sync), output system 502 stores and/or generates reference waveform table 532, which represents an ideal form of the output waveform desired to be generated by generator 540. Reference waveform table 532 may be stored as a table or other set of points (or setpoints) that reflect what the output waveform "should" look like. While a sinusoidal waveform is represented, any periodic waveform could be used. Reference waveform table 532 may alternatively be referred to as a reference waveform source.

Based on output feedback 516, output system 502 generates update table 534. Update table 534 includes entries or points to indicate how to modify the operation of generator 540 to provide an output more closely matching the waveform of reference waveform table 532. While indicated as a table, update table 534 may be a stored table that is modified at certain intervals (e.g., each entry is updated as necessary to reflect measured error data), or may be generated newly at each update interval. Update table 534 may alternatively be referred to as an update data source. The "updates" may be modifications of old values, the replacement of values, or may be stored in different locations within a memory accessed by controller 530. In one embodiment, each value of update table 534 indicates an "up," "down," or no change for each of a set of points. Such values are applied to the hardware that controls the output of generator 540 to cause the output signal to converge on the desired ideal waveform.

From one perspective, output system 502 can be viewed as having five features or components. While these features are depicted in FIG. 5 via certain block diagrams, it will be understood that different configurations and a variety of different components can be used to implement one or more of these features. For purposes of discussion, and not by way of limitation, these features are described following with references such as "Feature 1," "Feature 2," and so forth. It will be understood that such a convention is merely shorthand to refer to the subject matter of the described feature or component, and does not necessarily indicate anything with respect to order or significance.

Feature 1 may include means for incorporating specific timing, phasing or other frequency information. The means includes hardware and/or software to generate and receive the input synchronization data or load synchronization input referred to above, which is based on output sync 514. Feature 2 includes reference waveform table 532, which may include a table of data or an equation within software that represents the ideal form of output waveform 508. Feature 3 includes controller 530, which may be or include a software algorithm that compares the actual output waveform generated by generator 540 with the ideal tabular representation as represented by reference waveform table 532. Feature 4 includes an algorithm within controller 530 that computes or otherwise selects and generates update data represented by update table 534. Feature 5 includes generator 540 that uses the update data from update table 534 to generate output waveform 508 of the desired shape, proportion, timing, and phase.

With regard to Feature 1, the specific timing, phasing, or other frequency information provides synchronization information to the comparison and update algorithms in controller 530. The information may come by way of a table, equation, sampling of real-time hardware monitored signals, or other source.

With regard to Feature 2, the data representing the reference waveform, can be of any length and of any format, integer or non-integer, if within a table. Such a table may be generated dynamically at runtime or be hard-coded at compile time. The ideal form of the waveform represented may be sinusoidal or non-sinusoidal. The waveform may be represented by data values evenly spaced in the time domain or non-evenly spaced, forward in time or backward in time or any mix thereof. The waveform could alternatively be represented by data values in the frequency domain, and organized in any fashion. The data may be compressed or non-compressed. The data may be represented by an equation rather than computed data setpoints, or part by an equation and part by a table. In one embodiment, the stored setpoints in a table are the computed results of an equation. The data may be altered during processing at runtime to change the form of the ideal waveform to a different ideal. The values in reference waveform table 532 can be modified or replaced with different values if altered at runtime. The data may be aligned to be in exact phase with the input waveform or it may be shifted in phase.

With regard to Feature 3, controller 530 may include any traditional or standard comparison algorithm. A control algorithm compares data values representing the output waveform, sampled by hardware, and transformed into software data values through standard or non-standard sampling techniques. In one embodiment, the controller compares the ideal setpoints of the table or equation computations with the synchronization information, point by point, and generates error data, point by point. In one embodiment, the controller can process multiple points at once instead of point-by-point.

With regard to Feature 4, controller 530 includes a selection algorithm which creates or generates new data using any standard or non-standard technique. In one embodiment, the selection algorithm involves performing calculations. Alternatively, the selection algorithm may simply select data without performing processing or performing calculations. The selection algorithm may replace data values in a table of setpoints, or leave the data values in the table preferring to use another storage area. The selection algorithm may transform the data from the time domain to the frequency domain and vice-versa as part of its selection process. The algorithm provides an error update mechanism (e.g., algorithm) in that it identifies data values that will correct the output waveform when applied. Thus, the output waveform after application of the data values appears more like the preferred ideal waveform.

With regard to Feature 5, the new data values represented by update table 534 are applied to hardware in generator 540 through standard processes to drive the generation of the output waveform. In one embodiment, the new data values are applied via a PWM mechanism or any other mechanism that transforms discrete data values into an analog output form.

Figure 6:
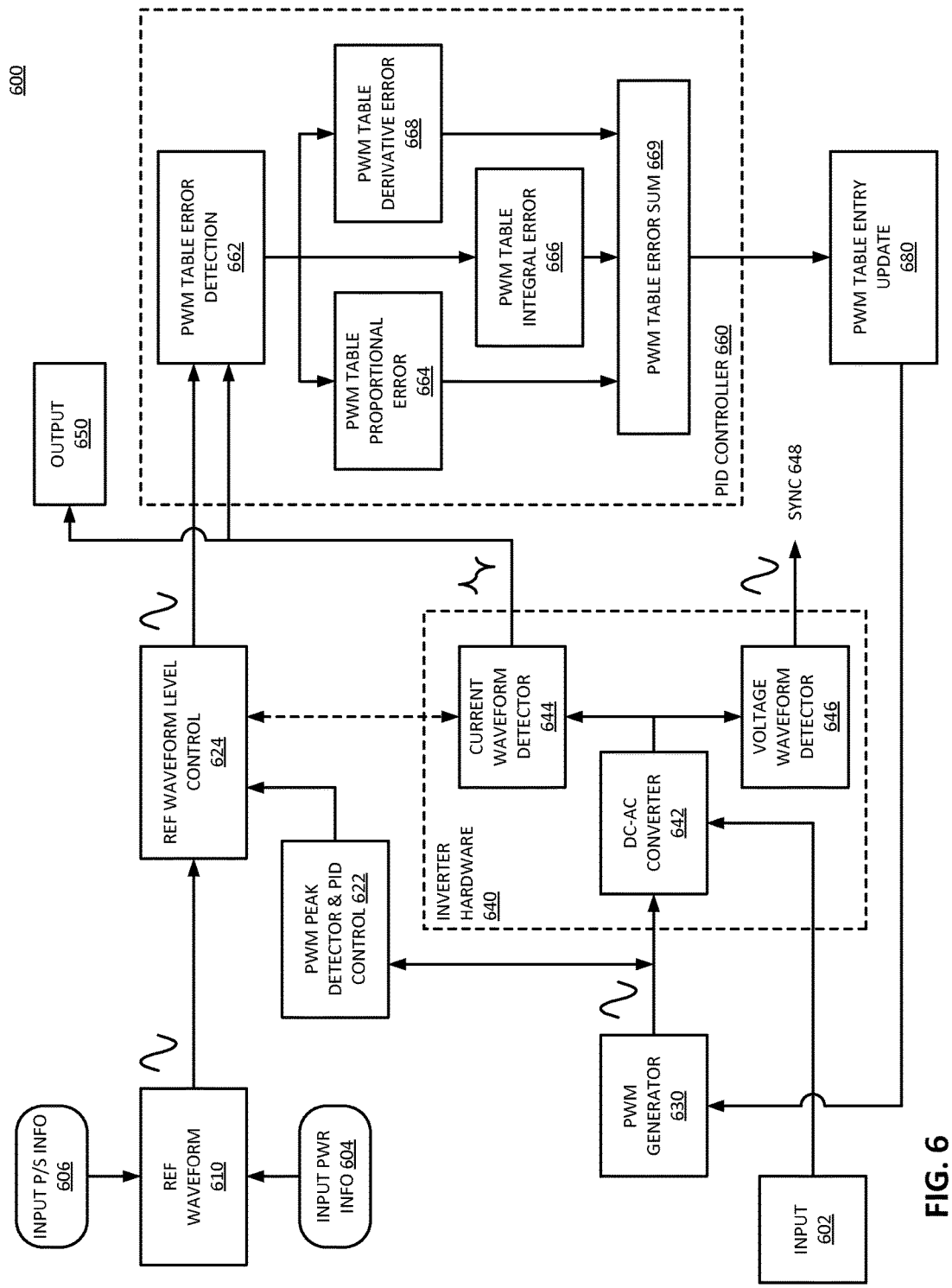
FIG. 6 is a block diagram of an embodiment of a system that controls harmonic distortion.

FIG. 6 is a block diagram of an embodiment of a system that controls harmonic distortion. In one embodiment, system 600 of FIG. 6 is an example of a grid-tied power conversion system implementing system 500 of FIG. 5. Thus, input 602 may correspond to input power from source 502, and output 650 may correspond to an output at load 506. In one embodiment, system 600 controls harmonic distortion of the output current signal and the phase shift between the grid voltage and the output current signal of a grid-tied solar photovoltaic or other source, DC to AC power conversion system.

System 600 inverts input DC power 602 into output AC power at output 650. In one embodiment, the voltage and current at output 650 are both ideal 60 Hz sinusoidal waves, undistorted by spurious harmonics, where the current either lags or leads the voltage by a phase shift. Such an implementation can be employed in a grid-tied system, where the output voltage is firmly established by the grid-tie at output 650, but the current is not. Regulations UL 1247 require that the current be reduced in harmonic distortion. As illustrated, system 600 provides at least the formation of an ideal sinusoidal waveform, shifted in phase from the fixed voltage of the grid, yet undistorted in aspect.

In one embodiment, the operations of system 600 can be separated as three elements. The first is to establish a table of ideal current waveform values for the desired waveform with a desired angle of phase shift without distortion. While described more specifically to output current waveforms and ideal current waveforms, it will be understood that such is a non-limiting example, and the discussion with respect to system 600 could be applied also to controlling output voltage waveforms, with modifications that will be understood by those skilled in the art. The second is to compare an actual output signal generated by a waveform generator to the ideal waveform. The third is to generate, with input timing information and the error information, an update table of values that allows the waveform generator to correct the actual output waveform. The operations iteratively improve the output waveform tending toward the ideal waveform (e.g., a sinusoid). Thus, the result of the operations places a pure 60 Hz current waveform in-phase with, leading, or lagging the grid voltage waveform.

The main power flow-through path in one embodiment occurs as follows: Input 602 is DC input power. PWM generator 630 drives DC-to-AC converter 642 using a table of updated values (PWM table entry update 680). In one embodiment, update table 680 corresponds with table 540 of FIG. 5. Input DC power 602 passes into DC-to-AC converter 642 of inverter hardware 640, and leaves as output AC current waveform 650. Current waveform detector 644 detects the current waveform at output 650. The input waveform is illustrated at PWM generator 630 as a perfect sine wave, and distorted at current waveform detector 644. The amount of distortion may be exaggerated, but illustrates that the output waveform may not even initially look much like the ideal desired waveform. However, the waveform converges through the feedback. Inverter hardware 640 also includes voltage waveform detector 646, which generates sync information 648, which corresponds to the output sync information of FIG. 5.

The control loop flow detecting and implementing the feedback occurs as follows: Information about the DC input power 604 and input phase shift information 606 refines a reference ideal waveform 610. The reference ideal waveform, as discussed above, can be stored as a table. In one embodiment, simultaneously the output of PWM generator 630 is peak detected 622 and allowed to scale the ideal table in reference waveform level control 624. The output of level control 624 is the instantaneous ideal waveform desired. The reference waveform from reference waveform level control 624 and the actual output is received at PID (proportional-integral-derivative) controller 660.

PID controller 660 includes PWM table error detector 662, which receives the scaled reference waveform and the actual output waveform. The error becomes the error input for proportional error block 664, integral error block 666, and derivative error block 668. The sum of the error signals is PWM table error sum, which provides the PID controller output to PWM table entry update 680. These updated table values are fed back into PWM generator 630 and drive the generator to adjust the output of inverter hardware 640, to converge the output signal to reference waveform 610.

Figure 7:
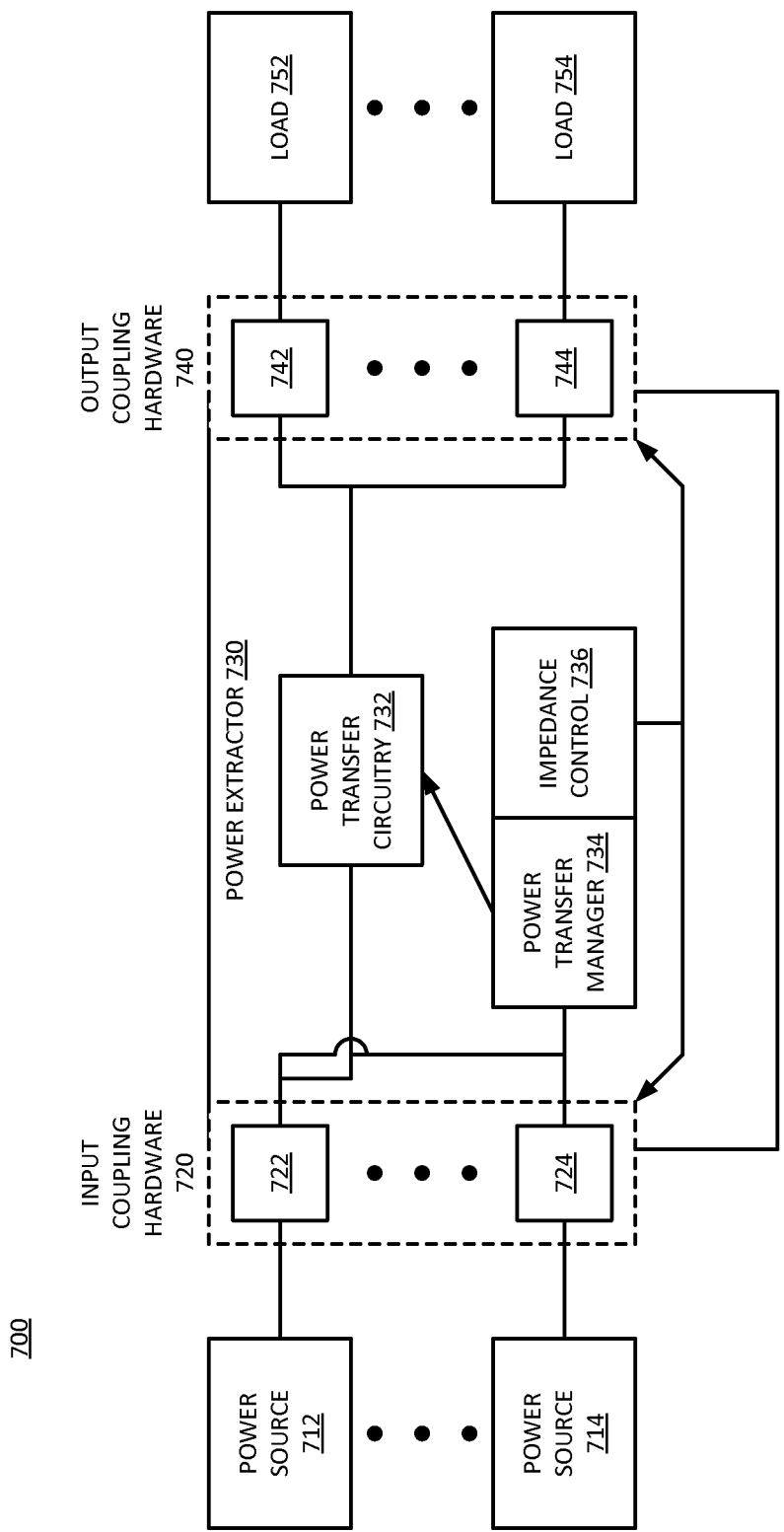
FIG. 7 is a block diagram of an embodiment of a system with multiple power sources, a power extractor, and multiple loads.

FIG. 7 is a block diagram of an embodiment of a system with multiple power sources, a power extractor, and multiple loads. System 700 provides a general use case scenario for power extractor 730. Power extractor 730 is an example of a power extractor according to any embodiment described herein. There may be one or more power sources 712-714 coupled to power extractor 730. Note that different power sources may require different coupling hardware. Input coupling hardware 720 includes interface circuits that couple the input power sources to power extractor 730. In some embodiments, interface circuit 722 is different from interface circuit 724. However, they may be the same.

Power sources 712-714 may be any type of DC power source (referred to as a power source or an energy source). In general, examples of DC power sources that may be used in accordance with embodiments of a power extractor include, but are not limited to, photovoltaic cells or panels, a battery or batteries, and sources that derive power through wind, water (e.g., hydro-electric), tidal forces, heat (e.g., thermal couple), hydrogen power generation, gas power generation, radioactive, mechanical deformation, piezo-electric, and motion (e.g., human motion such as walking, running, or other motion). More specifically with respect to the grid-tied systems discussed herein, power sources 712-714 include any power source capable of providing power to a grid-tied load.

In general, power sources may include natural energy sources and man-made power sources, and may be stable (providing an essentially constant power but variable in magnitude) and unstable (providing power that varies over time). Input coupling hardware 720 may be considered to include the entire interface (e.g., from the cable/wire/trace to the connector/pin to the circuitry), or simply include the interface circuitry. The interface circuitry may include any type of discrete components (e.g., resistors, capacitors, inductors/transformers, diodes, or other electronics components) as is described herein, and as may otherwise be known in the art.

Additionally, in some embodiments, input coupling hardware 720 includes switches (e.g., power field effect transistors (FETs)) or other similar mechanisms that enable one or more power sources to be selectively disconnected or decoupled from power extractor 730. The coupling and decoupling of power sources can be performed, for example, via control signals from a management portion of the power extractor.

Similar to the input side, either power extractor 730 includes, or else there is coupled to power extractor 730 in system 700, output coupling hardware 740. Output coupling hardware 740 includes interface elements 742-744. There may be a one-to-one relationship between interface elements 742-744 and loads 752-754, but such a relationship is not strictly necessary. One or more loads can be coupled via the same output coupling hardware. A similar configuration can exist in input coupling hardware 720—the relationship of elements to sources may be one-to-one, or some other ratio. With a ratio other than one-to-one, there may be restrictions on selectively bringing individual sources or loads on- and off-line. Such restrictions could result in reduced efficiency (from an ideal otherwise potentially achievable) in impedance matching, though group matching may not necessarily be less efficient. Thus, loads and/or sources may be handled as groups, which can then be brought online or offline as a group, and impedance matched as a group.

Loads 752-754 may also be selectively coupled to power extractor 730 via output coupling hardware 740. One or more loads may be coupled or decoupled via a control signal in accordance with a management strategy. Power transfer manager 734 generally represents any type of power transfer management circuit, and may include one or more processing circuitry elements, such as microprocessors, field programmable gate arrays (FPGA), application specific integrated circuits (ASIC), programmable logic arrays (PLAs), microcontrollers, or other hardware control logic. Management of the power transfer is performed by power transfer manager 734, which can be considered to operate according to a power transfer management strategy. Such a strategy controls how power will be transferred, or how power transfer manager 734 will operate to manage power transfer. Operation to manage power transfer may include setting output lines to an active or inactive state (e.g., toggling a microprocessor I/O pin), or otherwise sending configuration controls to other circuits.

Power transfer manager 734 monitors the input power for power changes to determine how to control the operation of power transfer circuitry 732. Power transfer circuitry 732 is described in more detail below, and generally enables power extractor 730 to convert power from the sources into power to deliver to the loads. It will be understood that with the ability to selectively couple and decouple sources and loads, power transfer manager 734 may include logic to adjust the power transfer according to any of a number of power transfer scenarios. Such ability enables dynamic system configuration changes while power extractor 730 maintains transfer efficiency.

Power transfer manager 734 and power extractor 730 can dynamically and continuously adjust to system configurations, as well as continuously monitoring input and/or output power curves. The logic accounts for the needs of the load(s), and the input of the source(s). In some embodiments, the needs of the loads can be determined by monitoring hardware. A simpler method is to include power profiles of the intended loads, which informs power transfer manager 734 how to control the output for particular loads. Power transfer manager 734 can identify which loads are present, and thus which profiles are applicable, based on load detection/monitoring, and/or via indication of a load by an external source (e.g., the load itself sends a signal such a triggering a load pin on a microprocessor, or a system management entity indicates which loads are present).

One inefficiency of traditional systems is the "always on" aspect to the switching supplies. Traditional power transfer technology consumed power even when the loads did not require power, and/or even when a source was not available. Thus, some part of the power transfer circuitry was always consuming power. In some embodiments, power transfer manager 734 can automatically turn power extractor 730 on and off based on the presence of power and/or load. Thus, for example, power transfer manager 734 may automatically enter a sleep state if the input power drops below a threshold (e.g., 1.0 mA at 5V). When the power is above the threshold, power transfer manager 734 may determine whether any loads are or should be connected. In the absence of source and/or load, power transfer manager 734 may not provide control signals, which results in no power transfer, or may produce signals to deactivate active circuitry. Power transfer manager 734 can be sophisticated and also or alternatively include a timer mechanism that enables the system to wake up after a period of time (e.g., 5 minutes) to re-check on the status of the system.

In some embodiments, the concepts of power management as embodied by power transfer manager 734 may be considered to include multiple aspects. For example, power management may include business rules and control, where each rule may control a different aspect of power control, or control the same power control aspect in a different manner. Business rules and control may be implemented as hardware, software, or some combination. The business rules may be broken down into planning rules, which are strategic rules that may look at impedance matching or monitor the power curve. Organizational rules may be tactical rules that determine how to deal with the multiple inputs and multiple outputs. The rules may provide and/or implement parameters that provide the particular functionality of power extractor 730. The control can implement actions or put into effect the business rules. For example, in some embodiments, impedance matching may match only a single power source. Selective matching would be performed for the input source that makes the most sense to match.

In some embodiments, determining how to transfer power to the loads or determining a power transfer strategy includes determining or identifying and selecting power distribution rules. The power transfer then occurs in accordance with the selected power distribution rule. Power distribution rules can be simple or complex, and may be generally classified as follows.

Hierarchical rules result in a simple precedence of one load over another. As source power fluctuates up and down, the power transferred to the loads may be to give preferential treatment to one load over the other. An example may be to favor the operational circuitry of a mission-critical device, while giving lower preference to a recharging one of several backup batteries.

Round robin rules institute a schedule for distributing power. For example, power can be distributed to one load for a period of time, then to another, then to another. Thus, all loads would receive some portion of distributed power in a given period of time. Allocation-based rules may institute fixed allocations for each load. For example, a system may allocate 80% of all distributed power to charging a main battery, leaving 20% for one or more other loads.

Time based rules allow the distribution of power to be based on the time of day, or time of week. For example, a system can be programmed with a sunrise/sunset schedule and have logic to determine peak sun hours. Thus, power may be expected to be at a peak from a solar panel at particular times of day. Based on the time of day, the system may distribute power according to one strategy or another. In another scenario, a system may have historical data that indicates peak load use. Power may be distributed at certain times of day according to the expected use. Note that as described below, peak input power and peak load may be actively determined and dynamically accounted for. Time based rules may then act as a framework for other rules to be applied. For example, during certain times of day, a round robin may be used, while a demand based strategy is employed at other times of day.

Functionality based rules enable the system to allocate power according to the load's functionality or purpose in the system. For example, in a pacemaker, the functional circuitry can be given priority over battery charging. Similarly, navigational equipment may be given a preferential treatment over cabin lights in an aircraft. Demand based rules can adjust the power transfer to be commensurate to demand of the loads. Demand based rules may require the addition of detection circuitry (not shown) in output coupling hardware 740. In some embodiments, power extractor 730 includes load balancing logic (hardware and/or software) to implement demand based rules. In some embodiments, command based rules can also be applied. That is, a central station or other control entity can provide a rule for how power should be distributed, which may override any other rules or conditions already in the system.

As already suggested, the power distribution rules can be applied consistently, or may be adjusted for any of a number of scenarios (e.g., change in demand, time of day, number/strength of power sources, or other variable condition).

Power transfer manager 734 may include or have associated impedance control 736. Impedance control 736 may refer to hardware and software that matches the impedance of input coupling hardware 720 and/or output coupling hardware 740 with associated sources or loads, respectively. Techniques for impedance matching are described above, and will not be repeated here.

Figure 8:
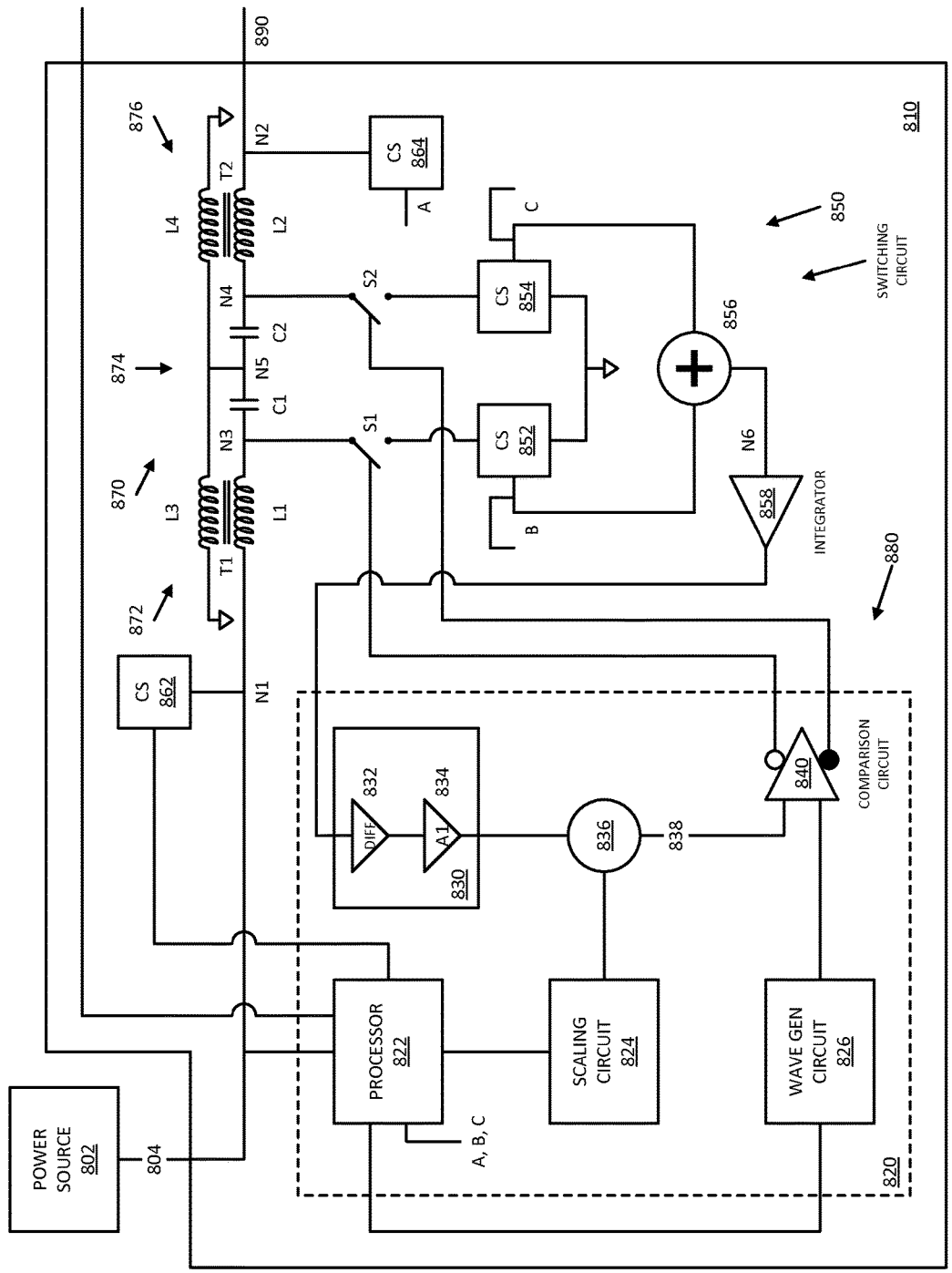
FIG. 8 is a block diagram of an embodiment of a power extractor.

FIG. 8 is a block diagram of an embodiment of a power extractor. Power change analysis circuitry 820 includes power change detection circuitry 830. Power transfer circuitry 870 includes circuits 872, 874, and 876. Circuits 872 and 876 include transformer T1 (including inductors L1 and L3) and transformer T2 (including inductors L2 and L4). Circuit 874 includes capacitors C1 and C2 and node N5 separating C1 and C2, and connected to inductors L3 and L4. Power source 802 is coupled to inductor L1 through conductor 804 of node N1, an interface connector, and a node N1*. The (*) designates the effective node, or the equivalent node seen looking into the system from the outside (N1* is seen from source 802, and N2* is seen from load 890). As an example, the interface connector may be a plug receptacle. If the impedance difference between N1, the interface connector, and N1* are relatively small, then they may be considered one node. Otherwise, they may be considered more than one mode. Likewise with node N2*, a corresponding interface connector, and node N2. Inductor L1 is between nodes N1* and N3, and inductor L2 is between nodes N4 and N2*.

Power change detection circuitry 830 detects a power change of power at node N1* and provides a switching control signal on conductor 838 (from element 836) to one input of comparison circuit 840. In one embodiment, power change detection circuitry 830 detects a slope of the power change and may be called power slope detection circuitry 830, and provide a power slope indication signal. In one embodiment, the power slope is an instantaneous power slope. Another input of comparison circuit 840 receives a waveform such as a saw tooth wave from waveform generator circuit 826. Comparison circuit 840 controls a duty cycle of switches S1 and S2. In one embodiment, S1 and S2 are not both open or both closed at the same time (with the possible exception of brief transitions when they are switching). Waveform generator circuit 826 and comparison circuit 840 are examples of circuitry in switching control circuitry 880.

When S1 is closed, electromagnetic fields change in T1 and T2 while the electrostatic potential across C1 and C2 is altered and energy from power source 802 is distributed electromagnetically into T1 and T2, while electrostatically in C1 and C2. When S1 opens, S2 closes and the magnetic flux in T1 begins to decrease. Thus, the energy stored in T1 flows through N3 to capacitors C1 and C2 of circuit 874, depositing some of the energy as an electrostatic field onto C1 and C2, and some of the energy into T2 of circuit 876 through node N5 and inductor L4. The residual flux in T2 also begins to decrease, transferring energy into load 890 through N2. When S1 closes and S2 opens again, the magnetic flux in T1 begins to increase while the magnetic flux T2 also increases as it consumes some of the electrostatic energy that was previously stored onto C1 and C2. Thus energy stored in circuit 874 is discharged and transferred to T2 and the load. By driving the switches at a proper frequency, T1 and T2 can be driven to saturation, resulting in an efficient transfer of energy from source 802 to the load.

Multi-phase energy transfer combines two or more phased inputs to produce a resultant flux in a magnetic core equivalent to the angular bisector of the inputs. (Note: an angle bisector of an angle is known to be the locus of points equidistant from the two rays (half-lines) forming the angle.) In this embodiment of the power extractor, capacitors C1 and C2 are used to shift the phase of the current that is applied to the secondary winding of T1 and T2 (L3 and L4 respectively). Thus, multi-phased inputs are applied to the cores of T2 and T3. The summation of the multiphase inputs alter the electromotive force that present during the increase and reduction of flux in the transformer's primary windings L1 and L3. The result is the neutralization (within the bandwidth of the operational frequency of the power extractor) of high frequency variations in the reactive component of the impedance that circuits 872 and 876 exhibit to the source and load respectively. Circuits 872 and 876 may be multiphase bisector energy transfer circuits to cause the multiphase bisector energy transfer and to interface with circuit 874.

Due to the dynamic properties of circuit 872, power source 102 "sees" an equivalent impedance at inductor L1 of power extractor 810. Likewise, with inductor L2 and load 890. The input and output impedances of power extractor 810 are adjusted by controlling the duty cycle of S1 and S2. Optimal matching of impedances to the power source 802 occurs when maximum power extraction from the power source is achieved.

Power slope detection circuitry 830, power change indication signal, and comparison circuitry 840 are part of a control loop that controls the duty cycle of switching circuitry 850 to achieve maximum power extraction (i.e., $\Delta P/\Delta V=0$) from power source 802. The control loop may also control the switching frequency of switching circuitry 850 to influence the efficiency of power transfer through the power transfer circuitry 870. Merely as an example, the frequency may be in the range of 100 KHz to 250 KHz depending on saturation limits of inductors. However, in other embodiments, the frequencies may be substantially different. The size and other aspects of the inductors and associated cores and other components such as capacitors can be chosen to meet various criterion including a desired power transfer ability, efficiency, and available space. In some embodiments, the frequency can be changed by changing the frequency of the waveform from waveform generator circuit 826. In some embodiments, the frequency is controlled by a control loop as a function of whether an on-time rise of current is between a minimum and maximum current in an energy transfer circuit.

As used herein, the duty cycle of switching circuitry 850 is the ratio of the on-time of S1 to the total on-time of S1 and S2 (i.e., duty cycle=S1/(S1+S2)). The duty cycle could be defined by a different ratio associated with S1 and/or S2 in other embodiments. When the voltages of power source 802 and load 890 are equal and the duty cycle is 50%, there is zero power transfer through power extractor 810 in some embodiments. If the voltages of power source 802 and load 890 are different, a higher or lower duty cycle may cause zero power transfer through power extractor 810. Thus, a particular duty cycle of switching circuitry 850 is not tied to a particular direction or amount of power transfer through power transfer circuitry 870.

It will be understood that the power change can be continuously detected and the switching control signal can be continuously updated. Using analog circuits is one way to perform continuous detection and updating. Using digital circuits (such as a processor) is another way to perform continuous detection and switching control signal updating. Even though the updating from some digital circuits may in some sense not be exactly continuous, it may be considered continuous when for all practical purposes it produces the same result as truly continuous updating. As an example, the updating of the switching control signal is also considered continuous when the frequency of change is outside the control loop bandwidth. In some cases, the updating of the switching control signal also could be considered continuous when the frequency of change is within the control bandwidth. Merely as an example, in some implementations, the control loop bandwidth may be around 800 Hz. In other embodiments, the control loop bandwidth is higher than 800 Hz, and perhaps much higher than 800 Hz. In still other embodiments, the control loop bandwidth is lower than 800 Hz and depending on the desired implementation and performance may be lower than 400 Hz.

A processor/ASIC and/or field programmable gate array (FPGA) 822 (hereinafter processor 822), scaling circuitry 824, current sensors (CS) 862 and 864 may also be included. Processor 822 receives signals indicative of the sensed current as well as voltage of node N1*. Letters A and B show connections between the current sensors and processor 822. In one embodiment, processor 822 also gathers information and/or provides control to sub-loads. The current information can be used to indicate such information as the rate, amount, and efficiency of power transfer. One reason to gather such information is for processor 822 to determine whether to be in the protection mode (such as the second mode) or the ordinary operating mode (such as the first mode).

In a protection mode, there are various things processor 822 can do to provide protection to power extractor 810 or load 890. One option is to open both switches S1 and S2. Another option is to provide a bias signal to scaling circuitry 824, which is combined in circuitry 836 with a power slope indication signal to create the switching control signal on conductor 838. For example, if the bias signal causes the switching control signal to be very high, the duty cycle would be low causing the current to be small. The regulation of power in the protection mode can be to completely shut off the power or merely to reduce the power. In the protection mode, the goal is no longer to maximize the power transferred. In some embodiments, the bias signal is asserted for purposes other than merely protection mode.

Additionally, current sensors 852 and 854 provide signals indicative of the current through switches S1 and S2, which are summed in summer 856. Power may be related to the average current from summer 856. These may be provided to integrator 858 to provide a signal indicative of the power, which is differentiated by differentiator 832 and amplified by amplifier 834.

Figure 9:
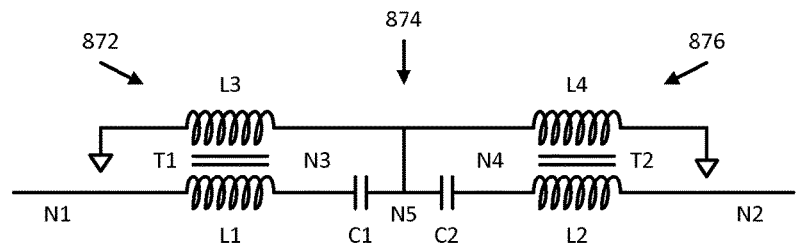
FIGS. 9-13 each illustrate a block diagram of an embodiment of an example of power transfer circuitry.

FIGS. 9-13 each illustrate a block diagram of an embodiment of power transfer circuitry. The power transfer circuitry of FIG. 8 is reproduced in FIG. 9, and can be compared with alternative power transfer circuitry illustrated in FIGS. 10-13. The values of the resistors, capacitors and inductors (such as R1, R2, C1, C2, C3, C4, L1, L2, L3, L4, L5, and L6) are not necessarily the same in each figure. Reference below to modifications of circuits 872, 874, and 876 will be understood to be modifications with reference to what is depicted in FIG. 9.

Figure 10:
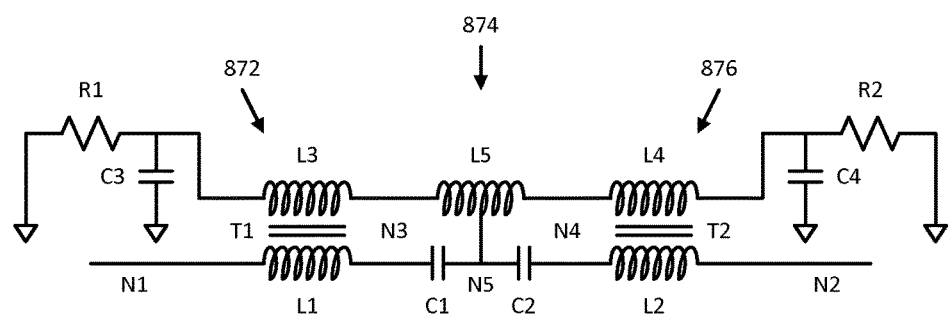

Referring to FIG. 10, circuits 872 and 876 are modified to include an RC circuit between inductors L3 and L4 and ground. Thus, the node of L3 connected to ground in FIG. 9 connects to R1 and C3 in parallel, which in turn connect to ground. Similarly, L4 connects to R2 and C4 in parallel, which in turn connect to ground. Additionally, circuit 874 is modified to include L5 connected between L3 and L4. N5, rather than being connected to L3 and L4, is connected (most logically in the middle) to the windings of L5.

Figure 11:
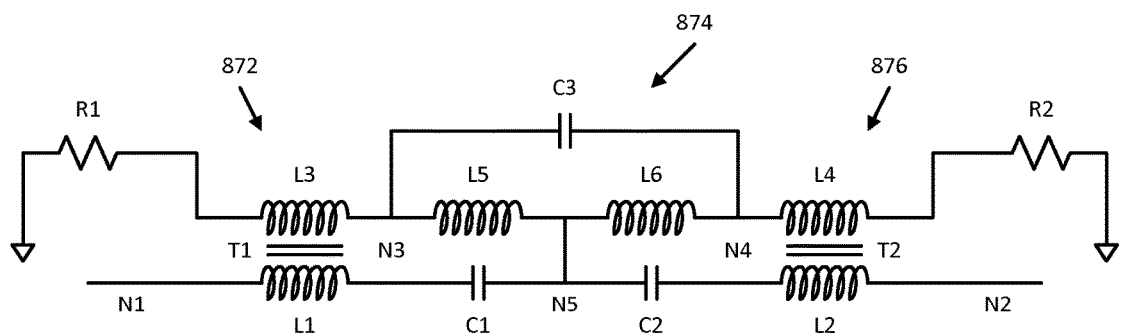

Referring to FIG. 11, circuit 872 is modified to include resistor R1 between L3 and ground, and circuit 876 is modified to include resistor R2 between L4 and ground. Additionally, circuit 874 is modified to include inductor L5 between L3 and node N5 and inductor L6 between L4 and node N5. Capacitor C3 is connected between L3 and L4.

Figure 12:
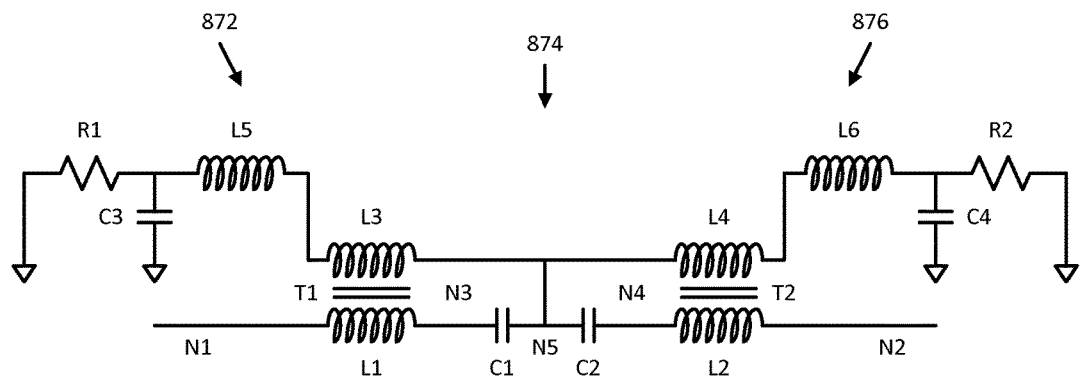

Referring to FIG. 12, circuit 872 is modified to include inductor L5 connected to L3, and L5 in turn connected to the parallel RC circuit of R1 and C3 to ground. Similarly, circuit 876 is modified to include inductor L6 connected to L4, where L6 is connected R2 and C4 in parallel to ground.

Figure 13:
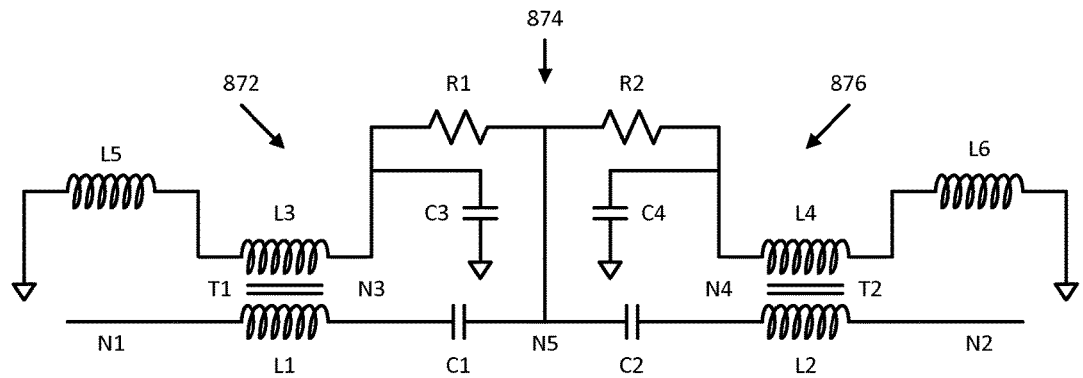

Referring to FIG. 13, circuit 872 is modified to include inductor L5 between L3 and ground, and circuit 876 is modified to include inductor L6 between L4 and ground. Circuit 874 is modified to connect R1 between L3 and N5, while R2 is connected between L4 and N5. Additionally, capacitor C3 is connected between L3 and R1 and ground. Similarly, capacitor C4 is connected between L4 and R2 and ground.

Figure 14:
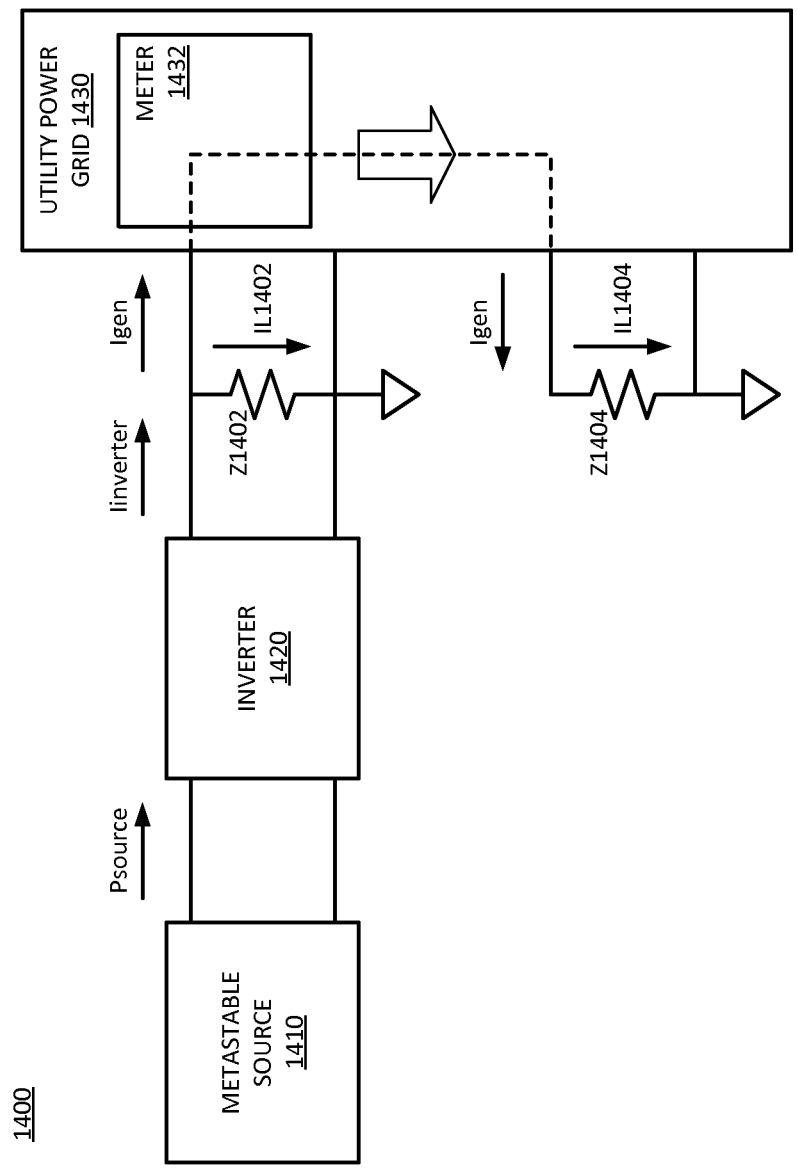
FIG. 14 is a block diagram of an embodiment of cogeneration of power from a local source and a utility grid to a grid load that neighbors the local source.

FIG. 14 is a block diagram of an embodiment of cogeneration of power from a local source and a utility grid to a grid load that neighbors the local source. System 1400 transfers power from a local source to a grid-tied load with power factor conditioning. System 1400 represents a power system that includes metastable source 1410, inverter 1420, load Z1402, and utility power grid 1430. Load Z1402 represents a first consumer premises tied to grid 1430, and load Z1404 represents a second consumer premises tied to grid 1430. Load Z1404 is not within the same electrical system with respect to a connection point to grid 130 as load Z1402, and is thus not local to load Z1402.

However, load Z1404 may be a neighbor, in that power output generated from a power source local to load Z1402 may be directed to load Z1404 with measurable effect. A load is not a neighbor for electrical purposes of the power sources if the load is far enough away geographically that the effect of power transfer from load Z1402 to Z1404 is only negligibly greater than an effect to the grid as a whole.

Source 1410 and inverter 1420 are local to load Z1402, and provide power to the load. In one embodiment, under normal operation, DC power is drawn from source 1410, and extracted, inverted, and dynamically treated by inverter 1420, to dynamically produce maximum AC current relatively free of harmonic distortion and variability, and completely in phase with the AC voltage signal from power grid 1430. Putting the generated AC current in phase with the grid AC voltage produces AC power with a power factor at or near unity to load Z1402, meaning that all reactive power drawn by the load comes from grid 1430. If source 1410 produces more energy than is needed to satisfy the real power requirements of load Z1402, the power-corrected and distortion-filtered power may be delivered to grid 1430 for further distribution.

The threshold voltage for transferring power to grid 1430 may be 3-5% above the average voltage of the grid. Ideally, the customer associated with load Z1402 would be compensated for the value of the excess power provided to grid 1430, either in the form of cash payments or as deductions from the cost of power consumed from grid 1430.

Excess power from source 1410 that is fed back to grid 1430 may be transferred to satisfy the load requirements of a neighbor load (e.g., load Z1404 of a second grid customer). In various embodiments, power may be transferred beyond a single transformer. In addition to providing traditional cogeneration power to grid 1430 (the power having desirable power factor and distortion characteristics), the operation of system 1400 can be modified to provide power having other characteristics that may be more desirable to grid 1430 (e.g., the utility company), particularly at times of peak power consumption.

More particularly, inverter 1420 may be configured (statically or dynamically) to produce power with current and voltage leading or lagging the other. In this way, power may be produced with a power triangle exhibiting inductive or capacitive reactive power that may be used by the utility to counteract or offset accretions of capacitive or inductive power, respectively, within a region of load Z1402. Again, the potential effect created by a single inverter 1420 on the grid may not transfer beyond one or two hops along the power grid. However, one or multiple inverters in a region can be effective at providing control in their local region, among a group of neighbors, for example. When that effect is multiplied by having such inverters in many neighborhoods, the grid can much more effectively be managed by local as well as utility power grid control.

Figure 15:
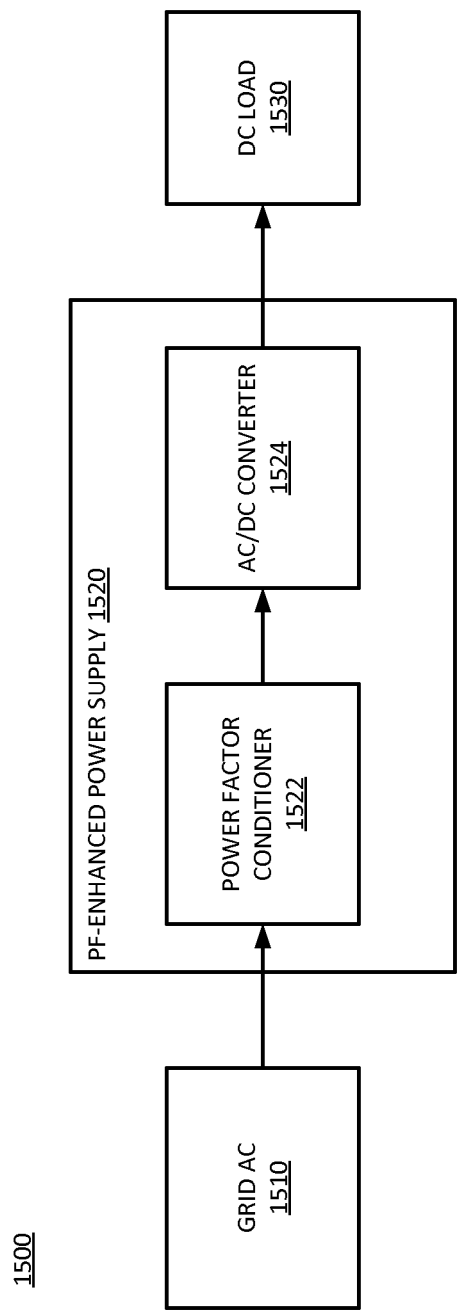
FIG. 15 is a block diagram of an embodiment of a power factor enhanced power supply.

FIG. 15 is a block diagram of an embodiment of a power factor enhanced power supply. In various embodiments, the efficiency of a power supply can be increased based on power factor enhancements. AC/DC power supplies have efficiency measured by comparing the AC power delivered to the supply with the DC power delivered to the load. With power factor conditioning as illustrated in system 1500, higher efficiency power supplies can be provided based on principles of power factor control as described herein.

System 1500 includes grid AC 1510, which is an AC power source. Rather than sending AC input directly to AC/DC converter 1524 as would be done in traditional systems, power factor (PF) enhanced power supply 1520 (hereinafter "power supply 1520") first conditions the power factor of the incoming AC power. Power factor conditioner 1522 modifies the input AC signal from source 1510 to deliver power to power supply 1520 having a power factor at or near unity at the input. At or near unity, or putting one signal in phase with another can be understood to mean that power factor is within a tolerance of a few percentage points from unity. It will be understood that power factor may not immediately reach unity, but there may be an adjustment period of up to several seconds to allow the system to condition the power factor to the desired value.

By creating a unity or near unity power factor at the input of the power supply, more real power is delivered to power supply 1520, which in turn increases the efficiency of DC power delivery to DC load 1530. Thus, the efficiency of the combined power factor conditioner and power supply with respect to the power provided by source 1510 is greater than that of a traditional power supply alone.

Figure 16A:
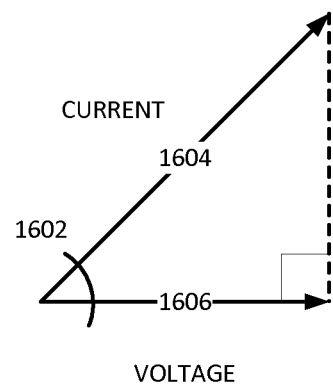
FIGS. 16A-B illustrate an embodiment of phase, active, and reactive power that are controlled by power factor conditioning.
Figure 16B:
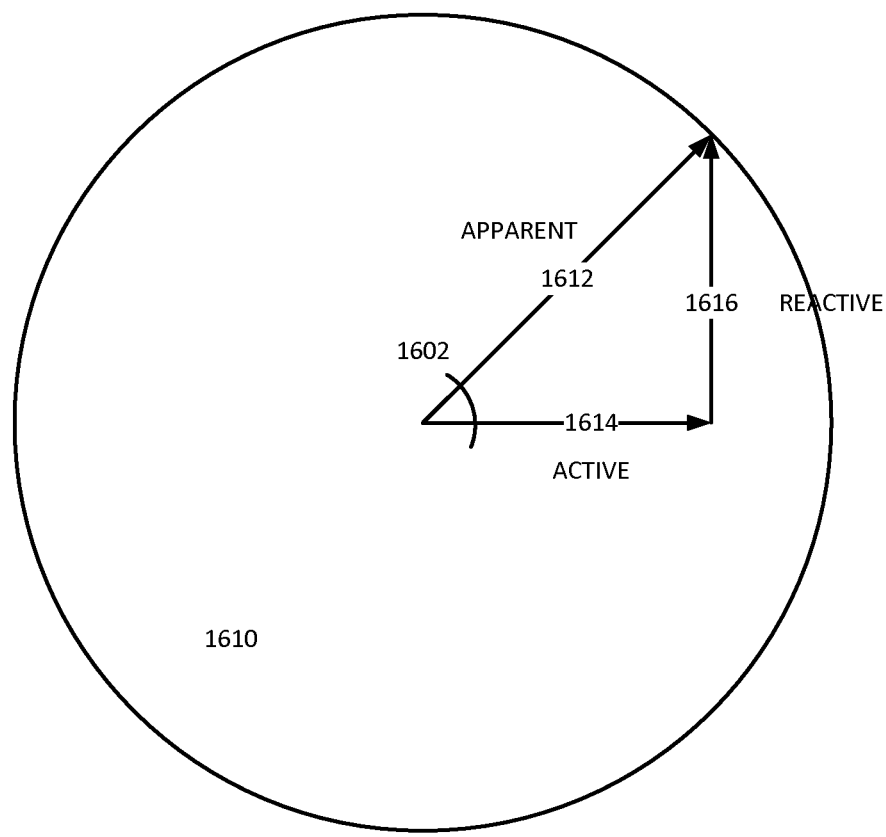

FIGS. 16A-B illustrate an embodiment of phase, active, and reactive power that are controlled by power factor conditioning. As is understood in the art, the term "reactive power" refers to the power associated with voltage and current out-of-phase by 90 degrees. Power in which the angle is out-of-phase by some other amount, for example, 80 degrees or 30 degrees, is a "mixture" of both active and reactive power.

Consider a right triangle as illustrated in FIG. 16A. In the triangle, base 1606 represents a voltage waveform, and hypotenuse 1604 represents current waveform. The angle 1602 between the voltage and current waveforms is the same angle as between active and apparent power. Adjusting the angle between the current waveform and the voltage waveform conditions the power factor to or toward a desired value.

FIG. 16B illustrates the right triangle with base 1614 representing the amount of active power, and vertical side 1616 representing the reactive power. Thus, angle 1602 between the horizontal or base and the hypotenuse (apparent power 1612) is the same as the angle between the voltage and current that together generates these powers. It will be understood that the length of hypotenuse 1612 is constant, and hence rides the circumference of circle 1610. Hypotenuse 1612 represents the "apparent" power. As angle 1602 increases, active power 1614 decreases, while reactive power 1616 increases. It is therefore possible, by controlling the phase angle to control the mix of active and reactive power.

The term "power factor" refers to the ratio of active 1614 to apparent 1612 power. It will be understood that the apparent power remains constant; thus, as angle 1602 increases, the power factor decreases. Therefore, an exactly meaningful, but considerably shorter, term for "phase angle between voltage and current" is "power factor". In the technical language, the two terms are used interchangeably. The maximum power factor equals 1, when phase angle 1602 has a value of 0. The minimum power factor equals 0, when phase angle 1602 is 90 degrees.

With the advent of adaptive generation and control of arbitrary waveforms at the electrical grid-tie by the power factor can be managed and controlled at the output of the inverter. Controlling the power factor at the output of the inverter is beneficial to the utilities because it provides an alternative means of providing the local distribution system with reactive power. The utilities therefore save considerable sums when local sources (e.g., solar photovoltaic (PV) systems) supply this reactive power, than if they have to produce it themselves or compensate for it locally.

The State of California, United States, recently required utilities operating in that state to pay solar PV owners for both active and reactive power when these owners supply them to the grid. It is expected that other states will follow suit. Therefore, there is considerable benefit to PV owners to supply a mix of both types of power depending on their agreed tariff and/or PPA.

The utilities therefore have an incentive to produce tariffs encouraging PV owners to construct power factor controlling PV systems, while PV owners have the incentive to use them on their PV systems. Supplying power to the grid from a PV (or other local source) system based on grid conditions (e.g., time of day, reactive and/or active power needs) can create a benefit to both the utility and the consumers.

Figure 17:
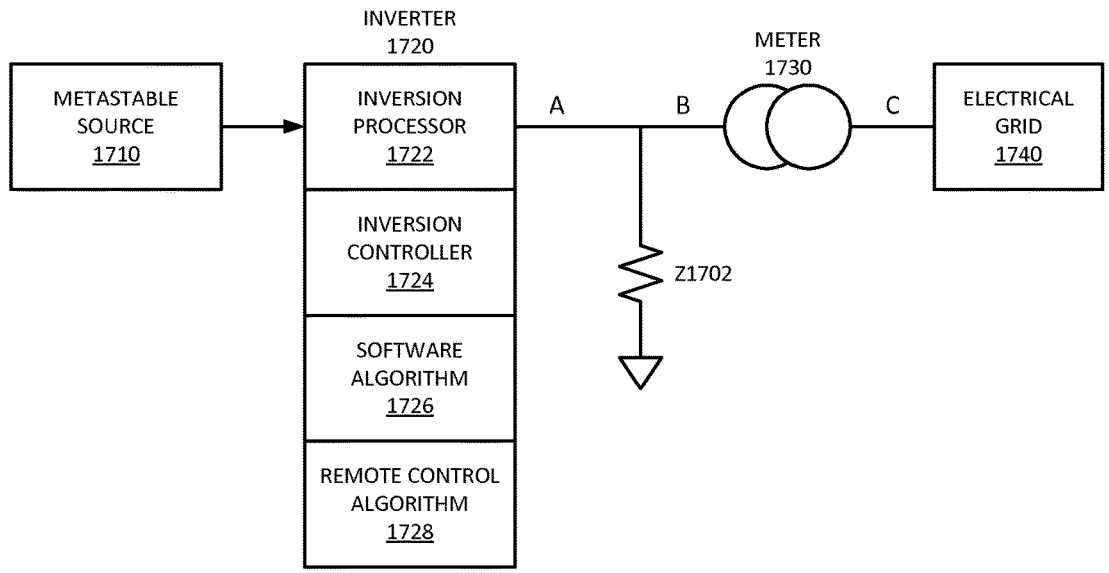
FIG. 17 is a block diagram of an embodiment of a system that controls power factor at a local load.

FIG. 17 is a block diagram of an embodiment of a system that controls power factor at a local load. System 1700 shows a typical inverter 1720 (e.g., a solar PV inverter), which controls the power factor at point "A", tied to utility electrical grid 1740 (hereinafter "grid 1740") through electrical measuring meter 1730 (hereinafter "meter 1730"). Point B represents the point of connection to grid 1740 for local load Z1702 and the electrical system associated with it (i.e., including source 1710 and inverter 1720). By providing a proper mix of active and reactive power, the benefits to owner of source 1710 are maximized, according to agreed-on elements of a tariff at meter 1730. Such control and management can occur either on demand, as, for example, by remote control communications to remote control algorithms 1728, or by automatic software algorithms 1726, both built into inverter 1720 itself. Inverter 1720 also includes inversion processor 1722 to provide power transfer functions as described above. Inversion controller 1724 controls the operation of inversion processor 1722 to convert power and condition the power factor.

It is possible to control the power factor at either Point B or Point C by controlling the power factor at Point A. It will be understood that Point C can be interpreted as anywhere on the grid. There are practical limits in distance to trying to control power factor too far away from meter 1730. Thus, Point C may be just beyond the meter, or some reasonable distance beyond the meter. There is an implementation in which monitoring can be done by the utility (for example, by using WiFi (e.g., 802.1x wireless systems)) for all or many of the arrays in a neighborhood or geographic area. Assuming there is a neighborhood of PV arrays automatically correcting for power factor, they can coordinate to benefit the utility if the utility has tariff agreements with the neighborhood owners to control their output power factor. In such an implementation, those inverters might need to know the power factor beyond the meter, but not so far away that it becomes meaningless.

Figure 18:
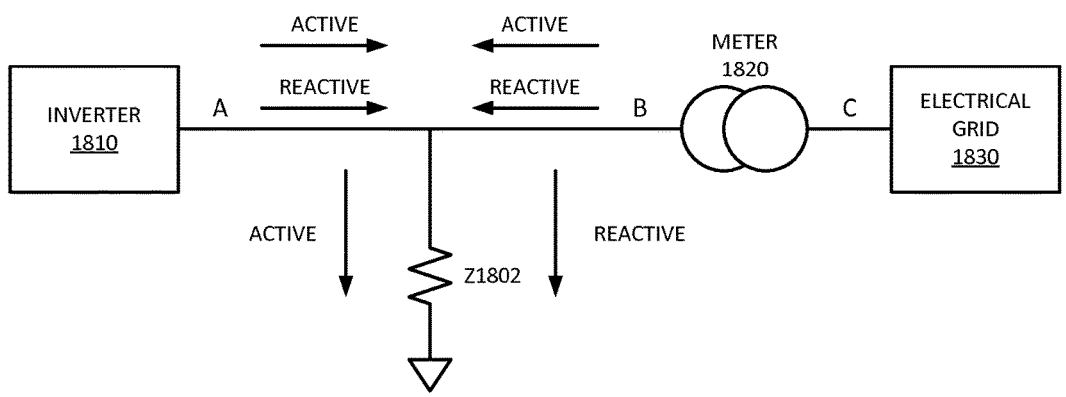
FIG. 18 is a block diagram of an embodiment of a system that controls power factor on a grid-facing connection by controlling power factor at a local load.

FIG. 18 is a block diagram of an embodiment of a system that controls power factor on a grid-facing connection by controlling power factor at a local load. System 1800 illustrates controlling the power factor at either Point B or Point C by controlling power factor at Point A. At any moment in time, the amount of power flowing into local load Z1802 is dictated by the characteristics only of the load, and not by anything else. That power can come from either inverter 1810 (from a local source), from grid 1830, or from both together. Both inverter 1810 and grid 1830 produce an apparent power, which consists of both active and reactive power (refer to FIGS. 16A and 16B above).

Hence, if an established tariff has the customer of Z1802 paying only for active power supplied by grid 1830, the best benefit to the consumer is to reduce the flow of active power from the grid across meter 1820. In that case, inverter 1810 should supply all active power and no reactive power, to satisfy the demands of local load Z1802. The reactive power needed by load Z1802 is then supplied in total by the grid. Reducing the phase angle at Point A will of necessity cause all reactive power to come from the grid. It will be understood that if the power factor of power from inverter 1810 is unity (1), then the reactive power component coming from inverter 1810 is zero, and all reactive power must be supplied by grid 1830. Thus, controlling the power delivery at point A necessarily affects the power coming into the electrical system from point B.

On the other hand, if an established tariff requires the customer to pay a higher cost for the reactive power than for the active power, the best benefit is for the inverter to provide all of the demands of load Z1802 for reactive power, while letting the grid supply most, if not all, of the load's active power demand. Increasing the phase angle at Point A will accomplish that goal for similar reasons to those mentioned above.

It may be that the best benefit to a customer according to an established tariff is to produce a mix of both active and reactive power. To the extent both can be supplied from a local power source, the needs of the local load can be satisfied by the local source. To the extent the local source supplies more than the local load requires, the remainder of the generated conditioned power can flow out onto grid 1830.

Thus, it will be understood that "best benefit" to the customer depends upon what an established tariff dictates. In many cases the best benefit can be calculated dynamically and applied in real time. For example, software algorithms embedded in the controlling apparatus of inverter 1810 can perform the calculations. At other times and situations, "best benefit" settings can be applied remotely through communications links.

Figure 19:
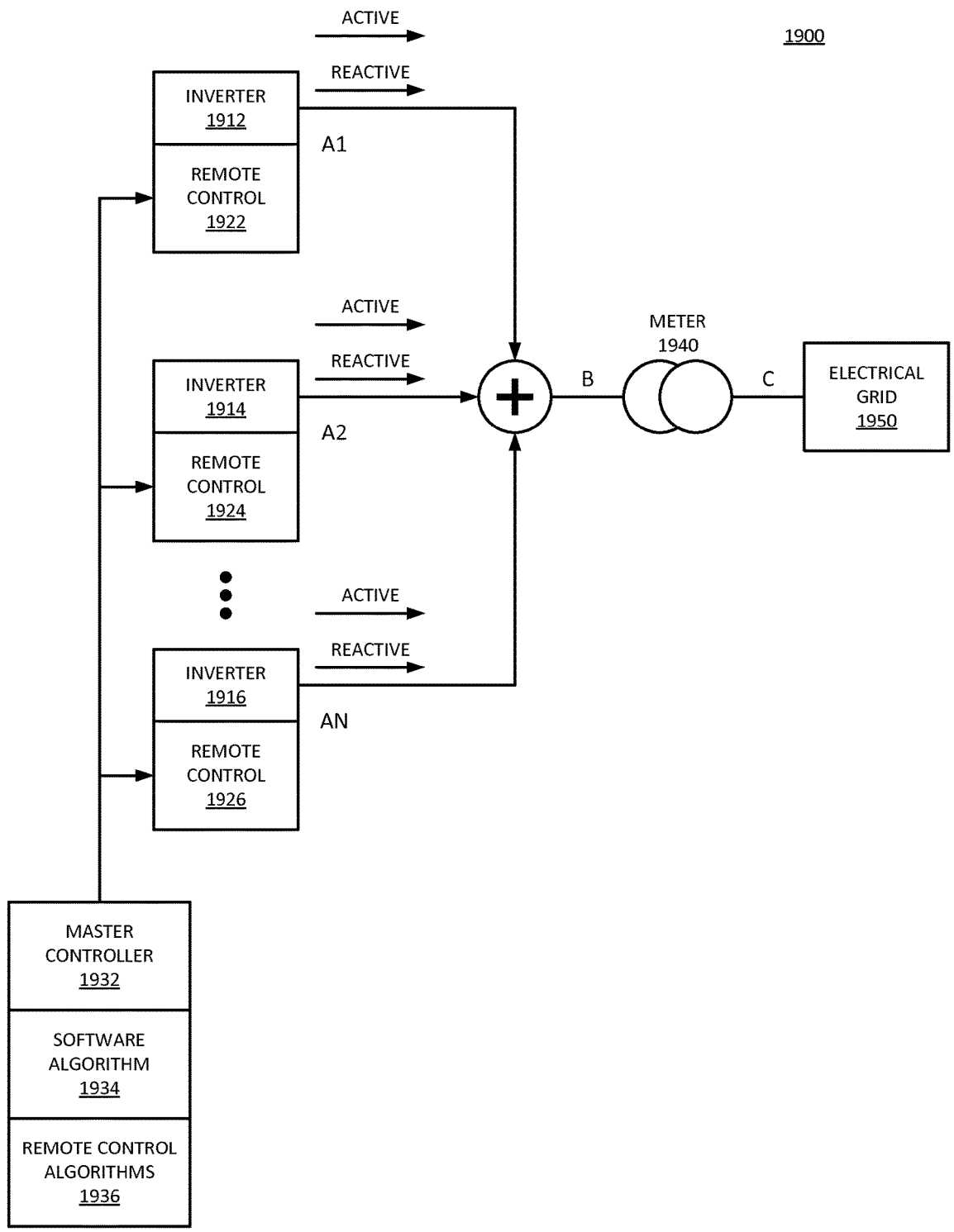
FIG. 19 is a block diagram of an embodiment of a system that controls power factor at a grid connection by controlling power factor at a power source farm.

FIG. 19 is a block diagram of an embodiment of a system that controls power factor at a grid connection by controlling power factor at a power source farm. In the case of a large local power source, such as a very large PV array, or a green energy "farm" (such as a "solar farm"), the "best benefit" at some particular moment may be controlled by the needs of the utility instead of the needs of the consumer. For example, the utility may be in need of an insertion of reactive power to the grid to support drooping voltages. In such a case, the utility may have devised a tariff, attached to a PPA (power purchase agreement), which gives the utility the right to control the power factor settings at the output of the solar farm. The power factor settings can be controlled remotely by the utility, rather than by local decision-making.

System 1900 illustrates such a scenario of a power source "farm" controlled by a master controller. System 1900 includes multiple inverters 1912-1916. Each inverter has an associated remote control mechanism 1922-1926, respectively. The remote control mechanisms may include communication interfaces (including connectors, physical networking interfaces, protocol stacks, and anything else necessary to communicate and receive commands remotely). The remote control mechanisms then also have control logic to apply the remotely received commands to adjust performance or output of the associated inverter.

The operation of the inverter is described above with respect to other figures. In addition to applying changes in response to a feedback signal, or instead of applying changes in response to a feedback signal, an inverter can apply changes in response to a remote command. The command may indicate a desired power factor, a delta or correction value, a relative value that can be applied, or may indicate to measure locally and correct based on measured values.

Master controller 1932 may be located at a utility, or may be a master controller located within the same electrical system as the inverters (i.e., on the same side of the point of connection to grid 1950). Master controller 1932 includes software algorithm mechanisms 1934 to enable the master controller to determine what power factor should be applied from the inverters based on conditions of the grid. Remote control algorithms 1936 represent mechanisms used by master controller 1932 to communicate with the inverters.

It will be understood that each inverter 1912-1916 individually can be set to a particular power factor, and the cumulative effect of the multiple devices in coordination would be to provide conditioned and filtered power at a particular power factor. While it is conceivable that the inverters individually may operate at different power factors, and as a whole system provide power at a particular power factor, there may be more efficiency in operating each inverter at the target power delivery conditions (power factor, voltage, and frequency). One advantage to such an approach is that the interfacing of the inverters to grid 1950 through point B at meter 1940 should be simpler and more efficient than if each inverter were operating at different settings.

With the configuration of system 1900, during an emergency the utility could remotely command all or some of the inverters in the farm to produce a majority of reactive power. It will be understood that in system 1900 there is no local load, but rather grid 1950 acts as an infinite sink of power. The grid will take either active or reactive power. Hence the utility can command the inverters to produce whatever mix of power they need to stabilize the grid voltage. Thus, control at the various points A1, A2, . . . , AN, can affect the grid at points B and C, at least within a certain geographic region.

As described, power factor conditioning provides a mechanism for the selection of a mix of active and reactive power at the output (points A1-AN) of each inverter 1912-1916, and at the grid-tied electrical meter (point B and/or point C), automatically using software algorithm(s) embedded within each inverter. Additionally, system 1900 provides a mechanism for the remote selection and establishment of such a mix over communication interfaces (e.g., an internet browser, telephone, radio or other manner of communications) using software protocols built into each inverter. Additionally, system 1900 provides a mechanism for master controller 1932 to control the desired mix of active and reactive power emanating from one or more slave inverters, using either the automatic mechanism of each inverter and/or the remote communications mechanism.

Figure 20:
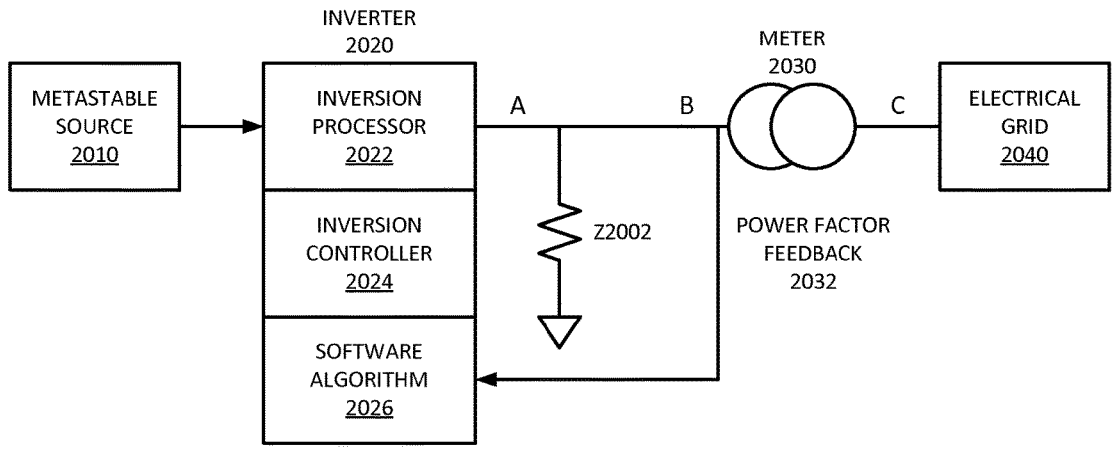
FIG. 20 is a block diagram of an embodiment of a power factor feedback mechanism.
Figure 21:
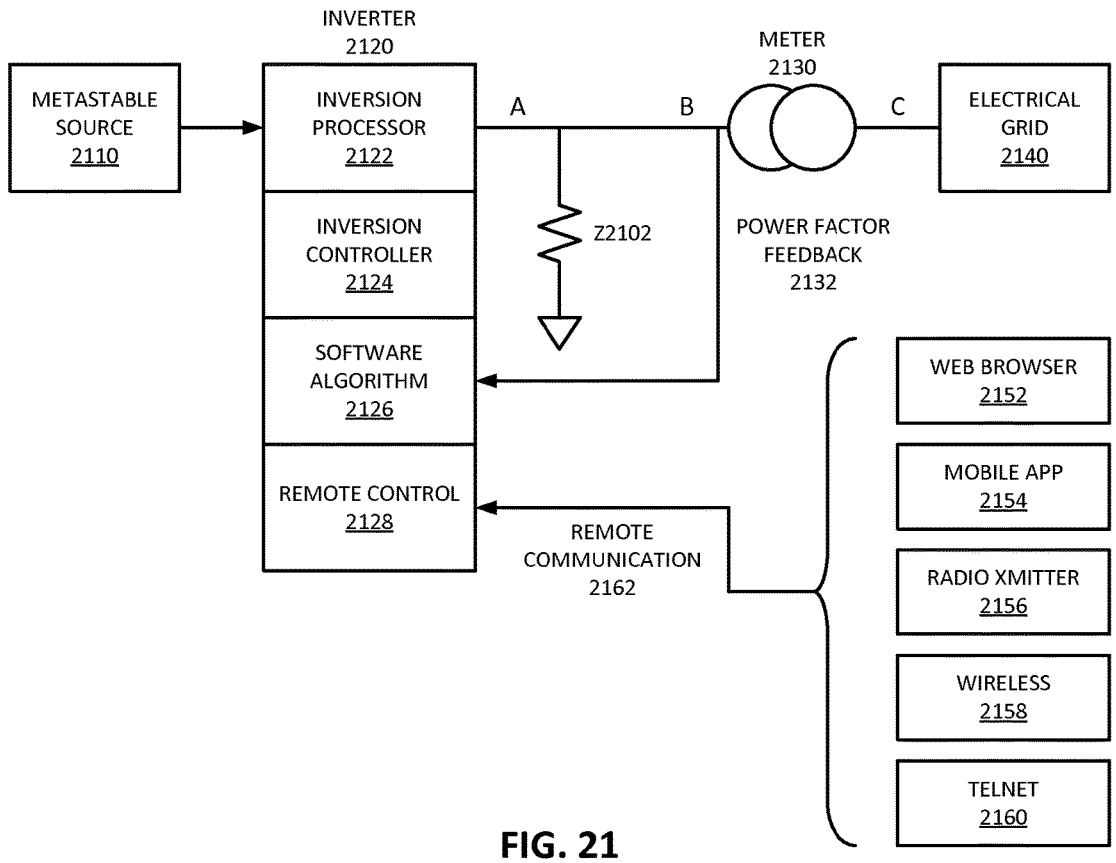
FIG. 21 is a block diagram of an embodiment of a communication system to control power factor remotely.
Figure 22:
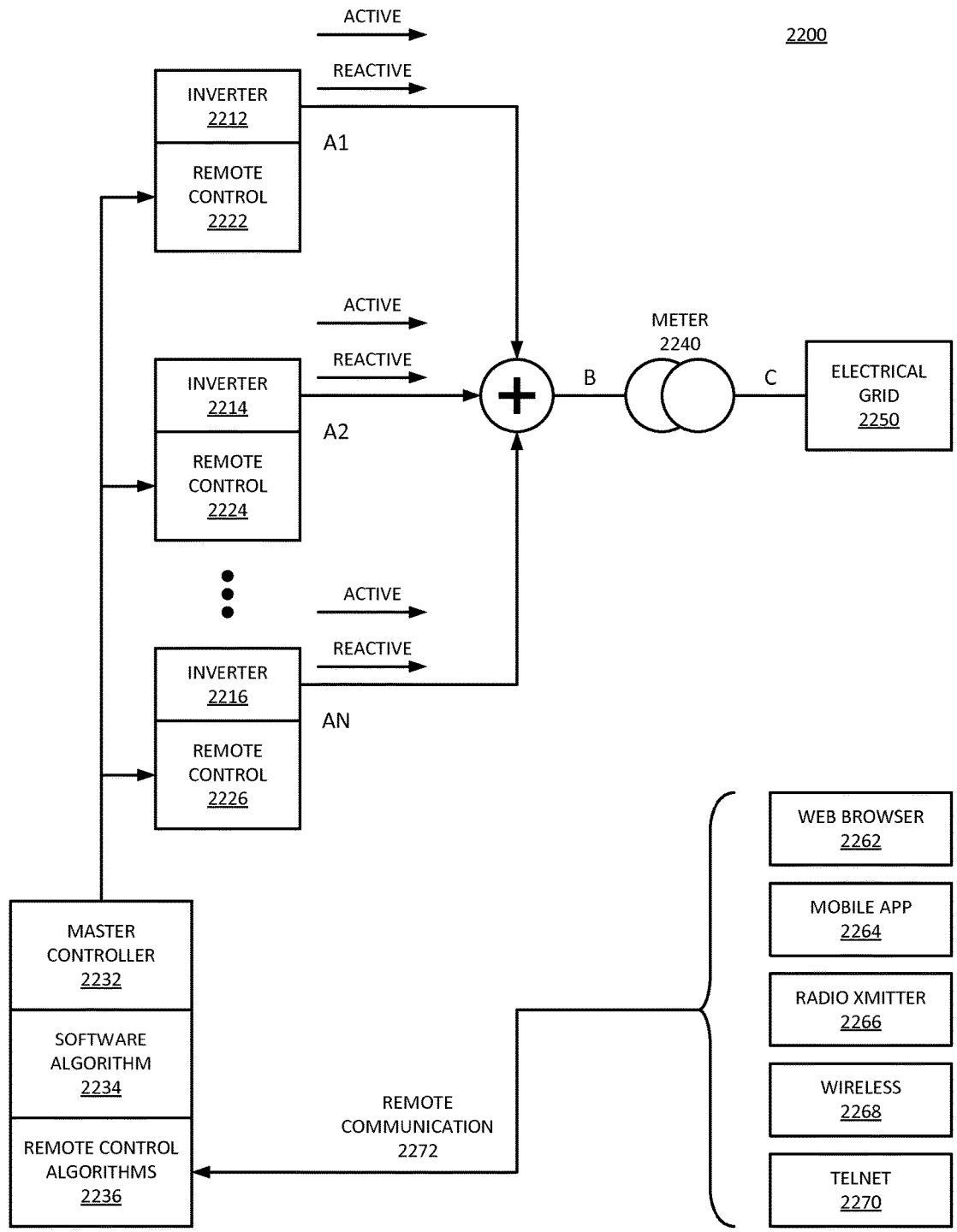
FIG. 22 is a block diagram of an embodiment of a system that controls power factor with a master/slave configuration.

FIGS. 20, 21, and 22 illustrate various mechanisms used to provide power to loads and deliver excess power to an electrical grid. FIG. 20 focuses on the use of grid monitoring to identify the power factor at the grid, feeding the information to a single inverter, where internal algorithms determine a preferred mix of active and reactive power. FIG. 21 focuses on the use of communication protocols over communication media or communication lines the internet, cell phone lines, or other communications medium to allow remote power factor setting. The remote communication may allow for utility control of the power factor setting, rather than owner control. Such control is possible in a configuration such as that of system 2100. FIG. 22 focuses on the use of a master controller, which dictates a desired output mix to single inverters, or to groups of inverters. The master controller can act according to an automatic mechanism relying on its internal software algorithms, or to a remote communications mechanism relying on remote communications.

FIG. 20 is a block diagram of an embodiment of a power factor feedback mechanism. System 2000 illustrates source 2010 providing DC power to inverter 2020, which includes inversion processor 2022, inversion controller 2024, and software algorithm 2026. Power is delivered from inverter 2020 to load Z2002. System 2000 also illustrates monitoring of power factor at point B with power factor feedback 2032. Alternatively, monitoring could occur at point C beyond meter 2030 as well as at point B.

Monitoring the power factor at either point B or point C allows software algorithms 2026 (i.e., control logic) to compare the actual power factor with the desired power factor, and thus self-regulate the output power of inverter 2020 at point A. As shown above, by controlling the output at point A, inverter 2020 moves the power factor of the grid-tied connection or the point of connection looking out to the grid toward a value of best benefit. The best benefit may not always be a power factor of unity. As described above, the power factor may be best set at a value based on power grid conditions as well as tariff conditions. Algorithm (s) 2026 may use a "best benefit" calculation that depends on the currently applicable tariff, which may include any and all factors that the utility might require in such a tariff.

FIG. 21 is a block diagram of an embodiment of a communication system to control power factor remotely. System 2100 illustrates source 2110 providing DC power to inverter 2120, which includes inversion processor 2122, inversion controller 2124, software algorithm 2126, and remote control mechanism 2128. Power is delivered from inverter 2120 to load Z2102. Power from grid 2140 is measured at meter 2130. Power factor may be measured at point B (or some other point C) and provided to software algorithm 2126 as power factor feedback 2132.

System 2100 also illustrates the use of remote communication 2162. Each form of communication may use a different communication protocol. Remote control 2128 may include support for one or multiple communication mechanisms. Such mechanisms may include communication, for example, over the internet by web browser 2152, by cell-phone or other mobile application 2154, by radio transmitter (by any signal in an RF band) 2156, by home or community wireless systems (e.g., IEEE 802.1x systems) 2158, via Telnet 2160 or other dial-up mechanism, or by another communication mechanism. Such communication portals may feed commands, made at a location remote to load Z2102, to the power factor controller mechanisms of inverter 2120 (e.g., software algorithm 2126, inversion controller 2124, and inversion processor 2122). Inversion controller 2124 changes the power factor at point A, which ultimately changes the power factor at points B and C on grid 2140. The communication protocols include two direction communications, allowing information on the current power factor setting, either at point A, point B, and/or point C to be made to the remote controller. In one embodiment, the remote controller makes the decisions of "best benefit" power factor setting instead of allowing such a decision to be made locally, or to override such a decision made locally.

FIG. 22 is a block diagram of an embodiment of a system that controls power factor with a master/slave configuration. System 2200 includes multiple inverters 2212-2216, each with an associated remote control mechanism 2222-2226. Each inverter can provide a specific mix of active and reactive power to deliver to grid 2250 through meter 2240. Each inverter 2212-2216 is shown having an effective point A: A1, A2, . . . , AN. It will be understood that in certain embodiments all these points may be the same point. The output of all inverters is combined and delivered to the grid.

Master controller 2232 sends commands to one or more individual inverters 2212-2216 of system 2200 using a remote communication mechanism. Master controller 2232 controls the individual inverter "slaves" through a communication system via remote control 2222-2226. In one embodiment, master controller 2232 applies its own internal software algorithms 2234 to determine how to guide the behavior of the individual inverters, such illustrated in FIG. 19 above. Alternatively, master controller 2232 may use its own communication channel(s) via remote communication algorithms 2236 to communicate with one or more remote locations. In the case of remote communication, commands may appear in master controller 2232 over a communication portal, such as over the internet by web browser 2252, by cell-phone or other mobile application 2254, by radio transmitter 2256, by wireless systems 2258, via Telnet 2260, or other type of interactive channel and protocol. Such commands are forwarded by master controller 2232, after processing, to slave inverters 2212-2216. The slave inverters then change the power factor at A accordingly, thus affecting the power factor at points B and C on grid 2250.

Figure 23:
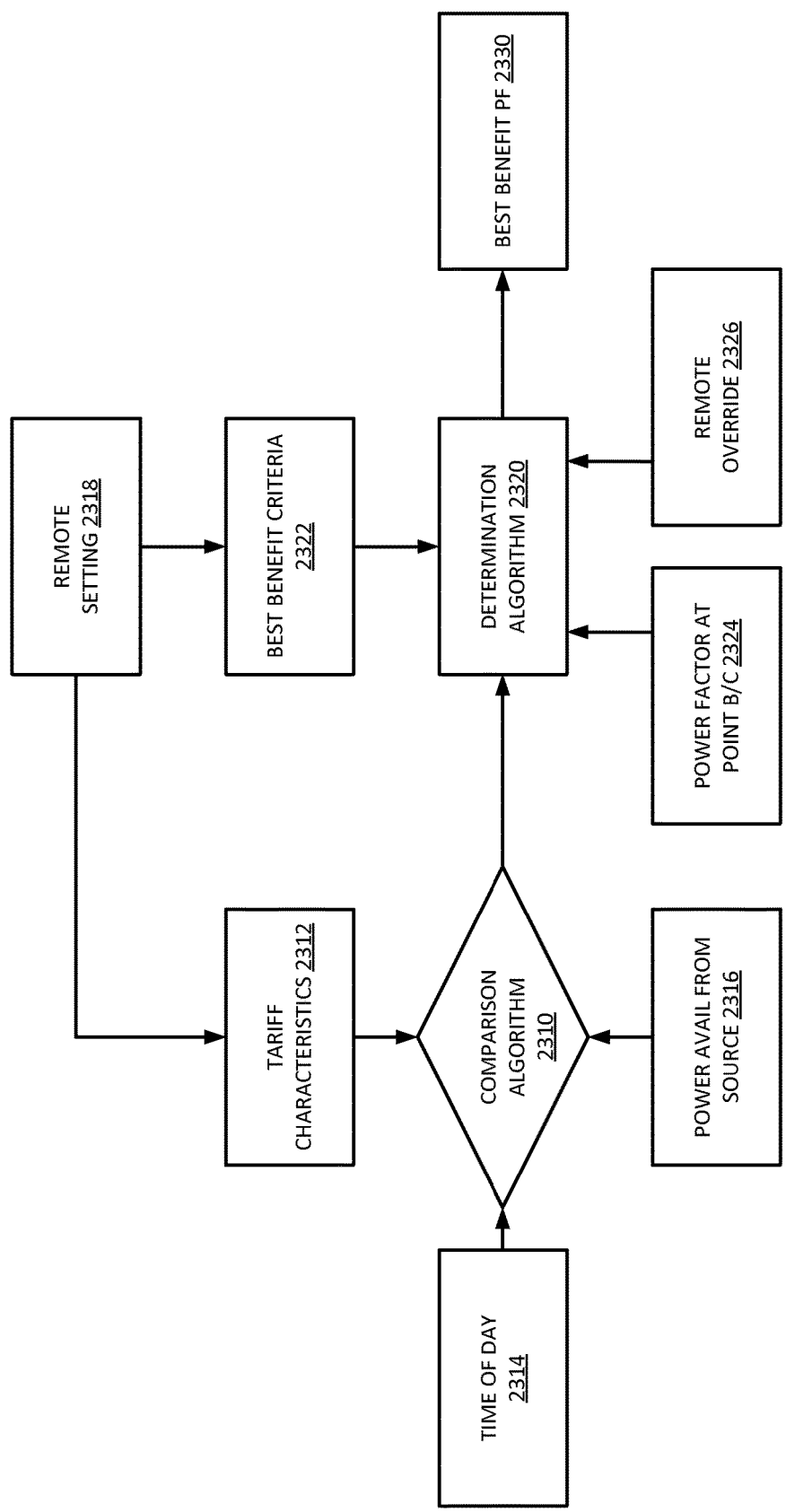
FIG. 23 is a block diagram of an embodiment of a control process for power factor control.

FIG. 23 is a block diagram of an embodiment of a control process for power factor control. The control process illustrated may be implemented, for example, by software algorithms in an inverter or a master controller, in accordance with what is described above. Comparison algorithm 2310 receives input about the time of day 2314, power currently available from connected power sources 2316, and tariff characteristics 2312. The comparison algorithm could be implemented as table lookups, as variable calculations, or in a state machine. Time of day 2314 is determined by a clock input. Tariff characteristics 2312 are configured into the system to indicate the most current tariff in place from the utility company. The tariff characteristics could be implemented as a set of rules or in a state machine. Power available 2316 is determined by measuring output at the devices that make up the power sources. The comparison generates a result that indicates a set of conditions based on the tariff.

The comparison algorithm result is received at determination algorithm 2320, which computes best benefit power factor 2330 based on the comparison result and multiple other conditions or factors. The characteristics of the tariff have associated best benefit criteria 2322, which is a set of rules that is used to interpret an intersection of the time of day, available power, and tariff characteristics. Determination algorithm 2320 also takes into consideration power factor as measured at the meter 2324 (either at points B or C). In one embodiment, there is also the possibility of remotely controlling or influencing the process; thus, remote override 2326 is considered by determination algorithm to determine if a remote or external command or control influences the determination.

In one embodiment, remote settings 2318 can be applied over remote communication channels as discussed above. Tariff settings can be configured and changed dynamically from a remote system. In addition to changing tariff characteristics 2312, best benefit criteria 2322 can also be changed or configured remotely.

The determination is implemented in the system by setting parameters that affect the power factor of the system. Thus, the output of the determination algorithm can be parameters used to set or adjust settings on current system controls that produce the current power factor. Similar to how settings may be remotely influenced, the determination process can also be remotely overridden. Overriding the process may be done by commands or controls that cause the system to not implement power factor changes computed by the determination algorithm, as well as by commands that override the settings computed by the determination algorithm.

As set forth in the claims below, in one embodiment, a method is implemented that includes receiving, at a power converter, direct current (DC) power from a local power source, the local power source and the power converter electrically located on a same side of a point of connection to a utility power grid as a local load tied to the power grid, where the local load includes a consumer premises of the power grid, converting with the power converter the DC power to alternating current (AC) power to deliver to the local load, conditioning a power factor of the AC power by controlling the phase of the generated current with respect to phase of the voltage of the power grid, and delivering the conditioned AC power on the local load side of the power grid.

The receiving may include receiving power from a metastable power source, or receiving the power at a microinverter installed on the consumer premises. A metastable local power source may include a solar power source, a tidal power source, a wind power source, or a thermally coupled heat source.

Conditioning the power factor may include receiving characteristic shape and phase information about a target periodic waveform having a phase with respect to an AC voltage of the power grid, generating an output waveform with output hardware, sampling the output waveform, comparing the output waveform to a corresponding reference output waveform, the reference output waveform representing an ideal version of the target periodic waveform based on the received characteristic shape and phase information, generating a feedback signal based on comparing the output waveform to the reference output waveform, and adjusting an operation of the output hardware at runtime based on the feedback signal, wherein adjusting the operation of the output hardware converges the output waveform toward the reference output waveform and phase.

Conditioning the power factor may further include conditioning the power factor by adjusting a phase of generated AC current with a table-based phase adjustment, or conditioning the power factor of the generated AC current based on conditions of the power grid. Conditioning based on conditions of the power grid may include measuring one or more conditions of the power grid from the customer premises, receiving measurements from outside the customer premises, or receiving a remote communication from the other side of the point of connection indicating a power factor adjustment and adjusting the power factor in response to receiving the remote communication. Receiving remote communication may include receiving a communication via internet, cellular, radio, or WiFi interface.

Conditioning the power factor based on conditions of the power grid may include receiving a communication from a master controller on the same side of the point of connection indicating a power factor adjustment, and adjusting the power factor in response to receiving the communication. Conditioning the power factor may include degrading the power factor away from unity responsive to conditions of the power grid.

Conditioning the power factor may include adjusting the power factor to approximately unity or to approach unity. Conditioning the power factor may include conditioning the power factor of the generated AC current based on a best benefit analysis, including considering a power rate tariff set by a utility of the power grid.

Delivering the conditioned AC power may include delivering conditioned AC power to the power grid. The power may be delivered to a specific geographic area, or to a neighbor load.

In an implementation of an inverter apparatus, the inverter may include input hardware to receive a direct current (DC) power from a local power source, the local power source and the inverter electrically located on a same side of a point of connection to a utility power grid as a local load tied to the power grid, where the local load includes a consumer premises of the power grid, inverter hardware to convert the DC power to alternating current (AC) power to deliver to the local load, power factor conditioning hardware to condition a power factor of the AC power by controlling the phase of the generated current with respect to phase of the voltage of the power grid, and output hardware to deliver the conditioned AC power on the local load side of the power grid.

The power factor conditioning hardware may include a software algorithm to locally determine power factor conditioning. The inverter may further include a remote control mechanism to receive a command from a remote device providing input for determining power factor conditioning.

In one embodiment, an implementation of power factor conditioning is performed for an AC to DC converter, where the method may include receiving, at an AC/DC power supply, alternating current (AC) power, conditioning a power factor of the AC power by controlling a phase of current of the AC power with respect to phase of an AC voltage of the power supply, wherein controlling the phase includes adjusting the phase of the current of the AC power to be in phase with the phase of the AC voltage, converting the conditioned AC power into direct current (DC) power, and delivering the DC power to a load of the power supply.

Conditioning the power factor may include conditioning the power factor by adjusting a phase of AC current based on a table-based phase adjustment.

Various operations or functions are described herein, which may be described or defined as software code, instructions, configuration, and/or data. The content may be directly executable ("object" or "executable" form), source code, or difference code ("delta" or "patch" code). The software content of the embodiments described herein may be provided via an article of manufacture with the content stored thereon, or via a method of operating a communication interface to send data via the communication interface.

A machine readable medium may cause a machine to perform the functions or operations described, and includes any mechanism that provides (i.e., stores and/or transmits) information in a form accessible by a machine (e.g., computing device, electronic system), such as recordable/non-recordable media (e.g., read only memory (ROM), random access memory (RAM), magnetic disk storage media, optical storage media, flash memory devices, or other hardware storage media). A communication interface includes any mechanism that interfaces to any of a hardwired, wireless, optical, medium to communicate to another device, such as a memory bus interface, a processor bus interface, an Internet connection, or a disk controller. The communication interface can be configured by providing configuration parameters and/or sending signals to prepare the communication interface to provide a data signal describing the software content. The communication interface can be accessed via one or more commands or signals sent to the communication interface.

Various components described herein may be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), or other programmable devices), embedded controllers, or hardwired circuitry.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method comprising:
   receiving, at a power converter, direct current (DC) power from a local power source, the local power source and the power converter electrically located on a same side of a point of connection to a utility power grid as a local load tied to the power grid, where the local load includes a consumer premises of the power grid;
   converting with the power converter the DC power to alternating current (AC) power to deliver to the local load, including generating a reactive power component from the DC power, wherein generating the reactive power component includes generating an AC current waveform based on a reference waveform that represents an idealized output waveform having a phase relative to an AC voltage waveform of the power grid, and includes generating the AC current waveform out of phase with respect to the AC voltage waveform of the grid, based on a table-based phase adjustment; and
   delivering the AC power on the local load side of the power grid.

2. The method of claim 1, wherein generating the reactive power component comprises:
   generating the reactive power component in response to detection of a reactive power need by the local load.

3. The method of claim 1, wherein generating the reactive power component further comprises:
   generating an output current waveform with output hardware;
   sampling the output current waveform;
   comparing the output current waveform to a corresponding reference output waveform;
   generating a feedback signal based on comparing the output current waveform to the reference output waveform; and
   adjusting an operation of the output hardware at runtime based on the feedback signal to converge the output current waveform toward the reference output waveform and phase.

4. The method of claim 1, wherein generating the reactive power component in response to detection of the reactive power need by the local load further comprises:
   generating an output current having a leading phase with respect to power grid voltage at the point of connection.

5. The method of claim 1, wherein generating the reactive power component in response to detection of the reactive power need by the local load further comprises:
   generating an output current having a lagging phase with respect to power grid voltage at the point of connection.

6. The method of claim 1, wherein generating the reactive power component comprises:
   generating the reactive power component in response to detection of a reactive power need by a local region.

7. The method of claim 1, wherein the local power source comprises a local renewable energy source.

8. The method of claim 1, wherein generating the reactive power component comprises:
   generating the output waveform based on the reference waveform having a phase that is in-phase with the AC voltage waveform of the grid.

9. The method of claim 1, wherein generating the reactive power component comprises:
   generating the output waveform based on the reference waveform having a phase that is out of phase relative to the AC voltage waveform of the grid.

10. An inverter apparatus comprising:
    input hardware to receive a direct current (DC) power from a local power source, the local power source and the inverter electrically located on a same side of a point of connection to a utility power grid as a local load tied to the power grid, where the local load includes a consumer premises of the power grid, including the inverter hardware to generate an AC current waveform based on a reference waveform that represents an idealized output waveform having a phase relative to an AC voltage waveform of the power grid;
    inverter hardware to convert the DC power to alternating current (AC) power to deliver to the local load, including generate a reactive power component from the DC power and generate the AC current waveform out of phase with respect to the AC voltage waveform of the grid, based on a table-based phase adjustment; and
    output hardware to deliver the AC power on the local load side of the power grid.

11. The inverter apparatus of claim 10, wherein the inverter hardware is further to generate an output current having a leading phase with respect to power grid voltage at the point of connection.

12. The inverter apparatus of claim 10, wherein the inverter hardware is further to generate an output current having a lagging phase with respect to power grid voltage at the point of connection.

13. The inverter apparatus of claim 10, wherein the inverter hardware is further to generate the reactive power component in response to detection of a reactive power need by the local load.

14. The inverter apparatus of claim 10, wherein the inverter hardware is further to generate the reactive power component in response to detection of a reactive power need by a local region.

15. The inverter apparatus of claim 10, wherein the inverter hardware is further to generate an output current waveform with output hardware;
- sample the output current waveform;
- compare the output current waveform to a corresponding reference output waveform;
- generate a feedback signal based on comparing the output current waveform to the reference output waveform; and
- adjust an operation of the output hardware at runtime based on the feedback signal to converge the output current waveform toward the reference output waveform and phase.

16. The inverter apparatus of claim 10, wherein the local power source comprises a local renewable energy source.

17. The inverter apparatus of claim 10, wherein the inverter hardware is to generate the reactive power component based on the reference waveform having a phase that is in-phase with the AC voltage waveform of the grid.

18. The inverter apparatus of claim 10, wherein the inverter hardware is to generate the reactive power component based on the reference waveform having a phase that is out of phase relative to the AC voltage waveform of the grid.

* * * * *